(12) United States Patent
Li et al.

(10) Patent No.: US 10,375,413 B2
(45) Date of Patent: Aug. 6, 2019

(54) BI-DIRECTIONAL OPTICAL FLOW FOR VIDEO CODING

(71) Applicant: QUALCOMM Incorporated, San Diego, CA (US)

(72) Inventors: Xiang Li, San Diego, CA (US); Jianle Chen, San Diego, CA (US); Wei-Jung Chien, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 324 days.

(21) Appl. No.: 15/277,433

(22) Filed: Sep. 27, 2016

(65) Prior Publication Data

US 2017/0094305 A1    Mar. 30, 2017

Related U.S. Application Data

(60) Provisional application No. 62/233,846, filed on Sep. 28, 2015.

(51) Int. Cl.
*H04N 19/52* (2014.01)
*H04N 19/573* (2014.01)
(Continued)

(52) U.S. Cl.
CPC ........... *H04N 19/52* (2014.11); *H04N 19/132* (2014.11); *H04N 19/136* (2014.11);
(Continued)

(58) Field of Classification Search
CPC .............................. H04N 19/52; H04N 19/132
See application file for complete search history.

(56) References Cited

U.S. PATENT DOCUMENTS

| | | | |
|---|---|---|---|
| 2007/0177674 A1* | 8/2007 | Yang .................... | H04N 19/597 375/240.25 |
| 2011/0002389 A1* | 1/2011 | Xu ........................ | H04N 19/61 375/240.16 |

(Continued)

FOREIGN PATENT DOCUMENTS

WO      2012108181 A1    8/2012

OTHER PUBLICATIONS

Alshin A., et al., "Bi-Directional Optical flow for Improving Motion Compensation", 28th Picture Coding Symposium (PCS 2010): Nagoya, Japan, Dec. 8-10, 2010, Dec. 1, 2010 (Dec. 1, 2010), pp. 422-425, XP055324095, Piscataway, NJ, DOI: 10.1109/PCS.2010. 5702525, ISBN: 978-1-4244-7134-8.

(Continued)

*Primary Examiner* — William C Vaughn, Jr.
*Assistant Examiner* — Jerry T Jean Baptiste
(74) *Attorney, Agent, or Firm* — Shumaker & Sieffert, P.A.

(57) ABSTRACT

An example device for decoding video data includes a processor configured to decode first and second reference pictures, wherein the first reference picture and the second reference picture are either both to be displayed before or after the current picture, determine a first motion vector ($MV_0$) from a current block of the current picture to a first reference block of the first reference picture, determine a second motion vector ($MV_1$) from the current block to a second reference block of the second reference picture, determine a first temporal distance ($TD_0$) from the current picture to the first reference picture, determine a second temporal distance ($TD_1$) from the current picture to the second reference picture, and decode the current block according to bi-directional optical flow (BIO) using $MV_0$, $MV_1$, $TD_0$, and $TD_1$.

44 Claims, 8 Drawing Sheets

(51) Int. Cl.
  *H04N 19/577* (2014.01)
  *H04N 19/139* (2014.01)
  *H04N 19/132* (2014.01)
  *H04N 19/136* (2014.01)
  *H04N 19/182* (2014.01)

(52) U.S. Cl.
  CPC ......... *H04N 19/139* (2014.11); *H04N 19/182* (2014.11); *H04N 19/573* (2014.11); *H04N 19/577* (2014.11)

(56) References Cited

U.S. PATENT DOCUMENTS

| 2013/0208795 | A1* | 8/2013 | Xu ..................... H04N 19/52 375/240.16 |
| 2016/0286229 | A1 | 9/2016 | Li et al. |
| 2016/0286230 | A1 | 9/2016 | Li et al. |
| 2016/0286232 | A1 | 9/2016 | Li et al. |
| 2018/0249172 | A1* | 8/2018 | Chen ..................... H04N 19/53 |

OTHER PUBLICATIONS

Alshina E., et al., "CE1: Samsung's Test for Bi-Directional Optical Flow", 95, MPEG Meeting; Jan. 24, 2011-Jan. 28, 2011; Daegu; (Motion Picture Expert Group or ISO/IEC JTC1/SC29/WG11), No. m19095, Jan. 15, 2011 (Jan. 15, 2011), 4 pp., XP030047662.

International Search Report and Written Opinion—PCT/US2016/054158—ISA/EPO—dated Dec. 7, 2016—14 pp.

QUALCOMM: "Harmonization and Improvement for BIO", ITU-T SG16 Meeting; Oct. 12, 2015-Oct. 23, 2015; Geneva, No. T13-SG 16-C-1045, Sep. 30, 2015 (Sep. 30, 2015), 3 Pages., XP030100753.

Alshina E., et al., "Known Tools Performance Investigation for Next Generation Video Coding", 52nd Meeting, Jun. 19-26, 2015, Warsaw, Poland; ITU-Telecommunications Standardization Sector, Study Group 16 Question 6, Video Coding Experts Group (VCEG), VCEG-AZ05, Jun. 25, 2015, 7 pp.

Kim et al., "New Frame Rate Up-Conversion Algorithms With Low Computational Complexity", IEEE Transactions on circuits and systems for video technology, Mar. 2014, vol. 24, No. 3, pp. 384-393.

Lee W.H., et al., "Frame Rate Up-Conversion Based on Variational Image Fusion", IEEE Transactions on image processing, Jan. 2014, vol. 23, No. 1, pp. 399-412.

Liu H., et al., "Multiple Hypotheses Bayesian Frame Rate Up-Conversion by Adaptive Fusion of Motion-Compensated Interpolations", IEEE transactions on circuits and systems for video technology, Aug. 2012, vol. 22, No. 8, pp. 1188-1198.

Tu S.-F., et al., "A Novel Framework for Frame Rate Up Conversion by Predictive Variable Block-Size Motion Estimated Optical Flow", International Congress on Image and Signal Processing (CISP), 2009, 5 Pages.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

International Preliminary Report on Patentability issued in International Application No. PCT/US2016/054158 dated Apr. 12, 2018, 8 pp.

* cited by examiner

BI-DIRECTIONAL OPTICAL FLOW FOR VIDEO CODING

This application claims the benefit of U.S. Provisional Application No. 62/233,846, filed Sep. 28, 2015, the entire contents of which are hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs), and/or coding nodes. Video blocks in an intra-coded (I) slice of a picture may be encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for coding (e.g., encoding or decoding) video data. More particularly, this disclosure describes various improvements to bi-directional optical flow (BIO) processing techniques. In particular, this disclosure describes techniques by which a block that is bi-directionally predicted from reference pictures that occur in the same direction (e.g., both reference pictures having display order values before a current picture or after the current picture) to be predicted using BIO. For example, a video coder may determine whether motion vectors that refer to reference blocks in the reference pictures are proportional to, or almost proportional to, corresponding temporal distances between the current picture and the reference pictures. In addition, or in the alternative, the video coder may avoid using BIO when at least one of the motion vectors is zero-valued and/or the current block occurs in a region of illumination change.

In one example, a method of decoding video data includes decoding a first reference picture and a second reference picture, the second reference picture being different than the first reference picture, adding the first reference picture to a reference picture list for a current picture, wherein the first reference picture and the second reference picture are either both to be displayed before a current picture or both to be displayed after the current picture, determining a first motion vector ($MV_0$) from a current block of the current picture to a first reference block of the first reference picture, determining a second motion vector ($MV_1$) from the current block to a second reference block of the second reference picture, determining a first temporal distance ($TD_0$) from the current picture to the first reference picture, determining a second temporal distance ($TD_1$) from the current picture to the second reference picture, and decoding the current block according to bi-directional optical flow (BIO) using $MV_0$, $MV_1$, $TD_0$, and $TD_1$.

In another example, a method of encoding video data includes decoding a first reference picture and a second reference picture, the second reference picture being different than the first reference picture, wherein the first reference picture and the second reference picture are either both to be displayed before a current picture or both to be displayed after the current picture, determining a first motion vector ($MV_0$) from a current block of the current picture to a first reference block of the first reference picture, determining a second motion vector ($MV_1$) from the current block to a second reference block of the second reference picture, determining a first temporal distance ($TD_0$) from the current picture to the first reference picture, determining a second temporal distance ($TD_1$) from the current picture to the second reference picture, and encoding the current block according to bi-directional optical flow (BIO) using $MV_0$, $MV_1$, $TD_0$, and $TD_1$.

In another example, a device for decoding video data includes a memory configured to store video data and one or more processors configured to decode a first reference picture and a second reference picture, the second reference picture being different than the first reference picture, wherein the first reference picture and the second reference picture are either both to be displayed before a current picture or both to be displayed after the current picture, determine a first motion vector ($MV_0$) from a current block of the current picture to a first reference block of the first reference picture, determine a second motion vector ($MV_1$) from the current block to a second reference block of the second reference picture, determine a first temporal distance ($TD_0$) from the current picture to the first reference picture, determine a second temporal distance ($TD_1$) from the current picture to the second reference picture, and decode the current block according to bi-directional optical flow (BIO) using $MV_0$, $MV_1$, $TD_0$, and $TD_1$.

In another example, a device for decoding video data includes means for decoding a first reference picture and a second reference picture, the second reference picture being different than the first reference picture, wherein the first reference picture and the second reference picture are either both to be displayed before a current picture or both to be displayed after the current picture, means for determining a first motion vector ($MV_0$) from a current block of the current picture to a first reference block of the first reference picture, means for determining a second motion vector ($MV_1$) from the current block to a second reference block of the second reference picture, means for determining a first temporal distance ($TD_0$) from the current picture to the first reference picture, means for determining a second temporal distance ($TD_1$) from the current picture to the second reference picture, and means for decoding the current block according to bi-directional optical flow (BIO) using $MV_0$, $MV_1$, $TD_0$, and $TD_1$.

In another example, a computer-readable storage medium has stored thereon instructions that, when executed, cause a processor of a device for decoding video data to decode a first reference picture and a second reference picture, the second reference picture being different than the first reference picture, wherein the first reference picture and the second reference picture are either both to be displayed before a current picture or both to be displayed after the current picture, determine a first motion vector ($MV_0$) from a current block of the current picture to a first reference block of the first reference picture, determine a second motion vector ($MV_1$) from the current block to a second reference block of the second reference picture, determine a first temporal distance ($TD_0$) from the current picture to the first reference picture, determine a second temporal distance ($TD_1$) from the current picture to the second reference picture, and decode the current block according to bi-directional optical flow (BIO) using $MV_0$, $MV_1$, $TD_0$, and $TD_1$.

The details of one or more examples are set forth in the accompanying drawings and the description below. Other features, objects, and advantages will be apparent from the description and drawings, and from the claims.

DETAILED DESCRIPTION

Figure 1:
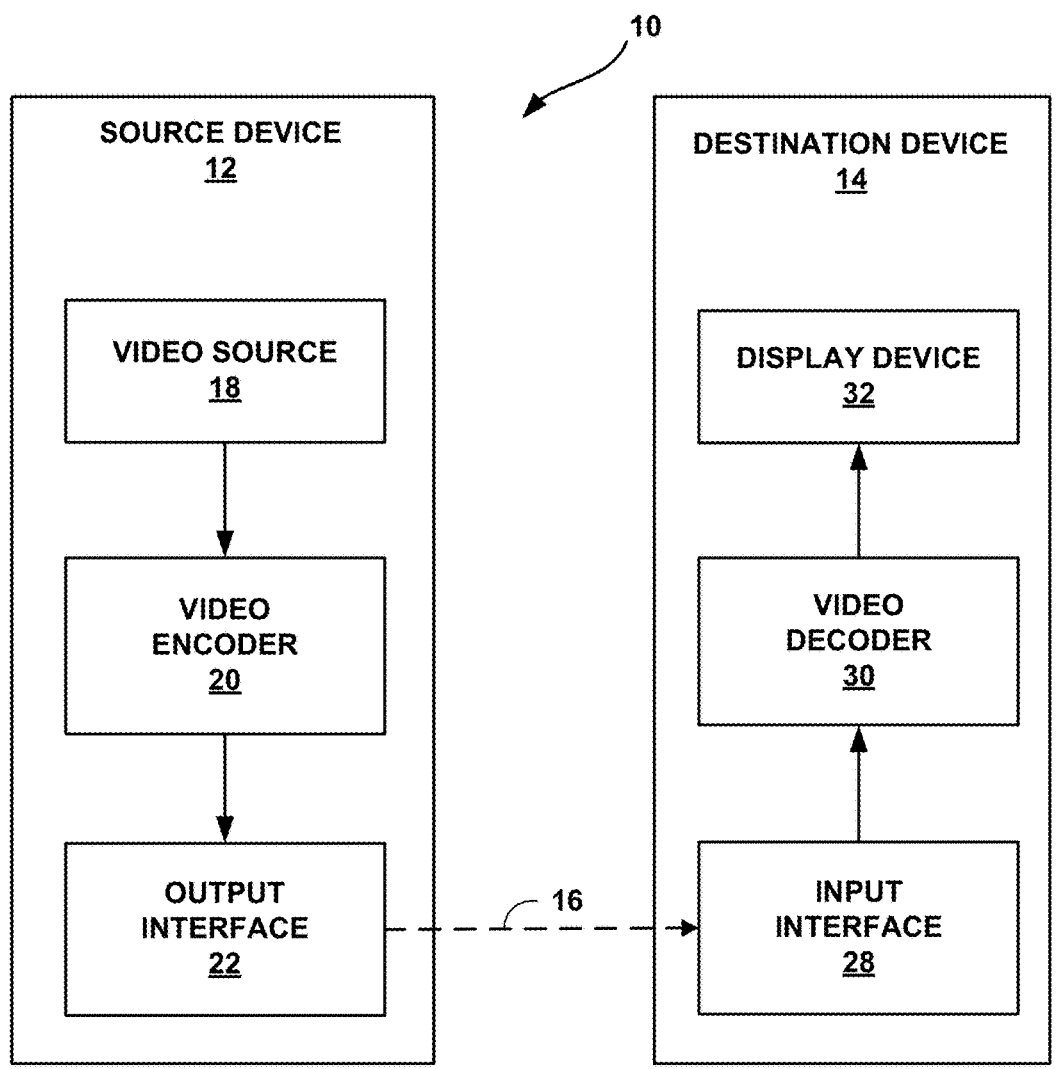
FIG. 1 is a block diagram illustrating an example video encoding and decoding system that may utilize techniques for bi-directional optical flow.

In general, the techniques of this disclosure are related to improvements of bi-directional optical flow (BIO). BIO may be applied during motion compensation. In general, BIO is used to modify a motion vector on a per-pixel basis for a current block, such that pixels of the current block are predicted using corresponding offset values applied to the motion vector. The various techniques of this disclosure may be applied, alone or in any combination, to determine when and whether to perform BIO when predicting blocks of video data, e.g., during motion compensation. In one example, the techniques of this disclosure include performing BIO when motion vectors used to inter-predict a block of video data of a current picture relative to reference blocks of reference pictures in a common prediction direction are in proportion to, or almost in proportion to, temporal distances between the current picture and the reference pictures, and to avoid performing BIO otherwise. Additionally or alternatively, BIO may be performed only when the block is not in a region of illumination change. Furthermore, the techniques by which BIO are performed generally include calculating gradients for the blocks. In accordance with the techniques of this disclosure, the gradients may be modified according to the temporal distances between the current picture and the reference pictures.

The techniques of this disclosure may be applied to any existing video codec, such as those conforming to ITU-T H.264/AVC (Advanced Video Coding) or High Efficiency Video Coding (HEVC), also referred to as ITU-T H.265. H.264 is described in International Telecommunication Union, "Advanced video coding for generic audiovisual services," SERIES H: AUDIOVISUAL AND MULTIMEDIA SYSTEMS, Infrastructure of audiovisual services—Coding of moving video, H.264, June 2011, and H.265 is described in International Telecommunication Union, "High efficiency video coding," SERIES H: AUDIOVISUAL AND MULTIMEDIA SYSTEMS, Infrastructure of audiovisual services—Coding of moving video, April 2015. The techniques of this disclosure may also be applied to any other previous or future video coding standards as an efficient coding tool.

Other video coding standards include ITU-T H.261, ISO/IEC MPEG-1 Visual, ITU-T H.262 or ISO/IEC MPEG-2 Visual, ITU-T H.263, ISO/IEC MPEG-4 Visual and the Scalable Video Coding (SVC) and Multiview Video Coding (MVC) extensions of H.264, as well as the extensions of HEVC, such as the range extension, multiview extension (MV-HEVC) and scalable extension (SHVC). In April 2015, the Video Coding Experts Group (VCEG) started a new research project which targets a next generation of video coding standard. The reference software is called HM-KTA.

Certain video coding techniques, such as those of H.264 and HEVC, that are related to the techniques of this disclosure are described below.

The following discussion relates to motion information. In general, a picture is divided into blocks, each of which may be predictively coded. Prediction of a current block can generally be performed using intra-prediction techniques (using data from the picture including the current block) or inter-prediction techniques (using data from a previously coded picture relative to the picture including the current block). Inter-prediction includes both uni-directional prediction and bi-directional prediction.

For each inter-predicted block, a set of motion information may be available. A set of motion information may contain motion information for forward and backward prediction directions. Here, forward and backward prediction directions are two prediction directions of a bi-directional prediction mode and the terms "forward" and "backward" do not necessarily have a geometry meaning. Instead, they generally correspond to whether the reference pictures are to be displayed before ("backward") or after ("forward") the current picture. In some examples, "forward" and "backward" prediction directions may correspond to reference picture list 0 (RefPicList0) and reference picture list 1 (RefPicList1) of a current picture. When only one reference picture list is available for a picture or slice, only RefPicList0 is available and the motion information of each block of a slice always refers to a picture of RefPicList0 (e.g., is forward).

In some cases, a motion vector together with its reference index is used in a decoding process. Such a motion vector with its associated reference index is denoted as a uni-predictive set of motion information.

For each prediction direction, the motion information contains a reference index and a motion vector. In some cases, for simplicity, a motion vector itself may be referred to in a way that it is assumed that it has an associated reference index. A reference index may be used to identify a reference picture in the current reference picture list (RefPicList0 or RefPicList1). A motion vector has a horizontal (x) and a vertical (y) component. In general, the horizontal component indicates a horizontal displacement within a reference picture, relative to the position of a current block in a current picture, needed to locate an x-coordinate of a reference block, while the vertical component indicates a vertical displacement within the reference picture, relative to the position of the current block, needed to locate a y-coordinate of the reference block.

Picture order count (POC) values are widely used in video coding standards to identify a display order of a picture. Although there are cases in which two pictures within one coded video sequence may have the same POC value, this typically does not happen within a coded video sequence. Thus, POC values of pictures are generally unique, and thus can uniquely identify corresponding pictures. When multiple coded video sequences are present in a bitstream, pictures having the same POC value may be closer to each other in terms of decoding order. POC values of pictures are typically used for reference picture list construction, derivation of reference picture sets as in HEVC, and motion vector scaling.

H. Liu, R. Xiong, D. Zhao, S. Ma, and W. Gao, "Multiple Hypotheses Bayesian Frame Rate Up-Conversion by Adaptive Fusion of Motion-Compensated Interpolations," IEEE transactions on circuits and systems for video technology, vol. 22, No. 8, August 2012; W. H. Lee, K. Choi, J. B. Ra, "Frame rate up conversion based on variational image fusion," IEEE transactions on image processing, vol. 23, No. 1, January 2014; and U. S. Kim and M. H. Sunwoo, "New frame rate up-conversion algorithms with low computational complexity," IEEE transactions on circuits and systems for video technology, vol. 24, No. 3, March 2014 describe a process referred to as frame-rate up-conversion (FRUC). FRUC technology may be used to generate high-frame-rate videos based on low-frame-rate videos. FRUC has been widely used in the display industry.

FRUC algorithms can be divided into two types. One type of method may be performed to interpolate intermediate frames by simple frame repetition or averaging. However, this method provides improper results in a picture that contains a lot of motion. The other type of method, called motion-compensated FRUC (MC-FRUC), considers object movement when it generates intermediate frames and includes two steps: motion estimation (ME) and motion-compensated interpolation (MCI). Video coding devices perform ME to generate motion vectors (MVs), which represent object motion using vectors, whereas video coding devices perform MCI using MVs to generate (e.g., interpolate) intermediate frames.

The block-matching algorithm (BMA) is widely used for ME in MC-FRUC, because it is simple to implement. A video coding device that applies BMA divides an image into blocks and detects the movement of those blocks. Two kinds of ME are primarily used for BMA: unilateral ME and bilateral ME. Examples of both types of ME are described in greater detail below.

Li et al., "VIDEO CODING TOOL BASED ON FRAME-RATE UP-CONVERSION," U.S. Provisional Application No. 62/139,572, filed Mar. 27, 2015, and Li et al., "VIDEO CODING TOOL BASED ON FRAME-RATE UP-CONVERSION," U.S. Provisional Application No. 62/182,367, filed Jun. 19, 2015, proposed a coding method based on the frame rate up-conversion (FRUC) method. The method was quite efficient and was adopted into HM-KTA-2.0 software.

E. Alshina, A. Alshin, J.-H. Min, K. Choi, A. Saxena, M. Budagavi, "Known tools performance investigation for next generation video coding," ITU—Telecommunications Standardization Sector, STUDY GROUP 16 Question 6, Video Coding Experts Group (VCEG), VCEG-AZ05, June. 2015, Warsaw, Poland (hereinafter, "Alshina 1"), and A. Alshina, E. Alshina, T. Lee, "Bi-directional optical flow for improving motion compensation," Picture Coding Symposium (PCS), Nagoya, Japan, 2010 (hereinafter, "Alshina 2") described a method called bi-directional optical flow (BIO). BIO is based on pixel level optical flow. According to Alshina 1 and Alshina 2, BIO is only applied to blocks that have both forward and backward prediction. BIO as described in Alshina 1 and Alshina 2 is summarized below:

Given a pixel value $I_t$ at time t, its first order Taylor expansion is $$I_t = I_{t0} + \frac{\partial I_{t0}}{\partial t}(t - t0) \quad (1)$$

$I_{t0}$ is on the motion trajectory of $I_t$. That is, the motion from $I_{t0}$ to $I_t$ is considered in the formula.

Under the assumption of optical flow:

$$0 = \frac{dI}{dt} = \frac{\partial I}{\partial t} + \frac{\partial I}{\partial x} \cdot \frac{\partial x}{\partial t} + \frac{\partial I}{\partial y} \cdot \frac{\partial y}{\partial t}$$

$$\frac{\partial I}{\partial t} = -\frac{\partial I}{\partial x} \cdot \frac{\partial x}{\partial t} - \frac{\partial I}{\partial y} \cdot \frac{\partial y}{\partial t}$$

$$\text{let } G_x = \frac{\partial I}{\partial x}, G_y = \frac{\partial I}{\partial y} \text{ (gradient)},$$

and equation (1) becomes $$I_t = I_{t0} - G_{x0} \cdot \frac{\partial x}{\partial t} \cdot (t - t_0) - G_{y0} \cdot \frac{\partial y}{\partial t} \cdot (t - t_0) \quad (2)$$

Regarding $$\frac{\partial x}{\partial t} \text{ and } \frac{\partial y}{\partial t}$$

as the moving speed, we may use $V_{x0}$ and $V_{y0}$ to represent them.

So equation (2) becomes $$I_t = I_{t0} - G_{x0} \cdot V_{x0} \cdot (t-t_0) - G_{y0} \cdot V_{y0} \cdot (t-t_0) \quad (3)$$

Suppose we have a forward reference at $t_0$ and a backward reference at $t_1$, and $$t_0 - t = t - t_1 = \Delta t = 1$$

We have $$I_t = I_{t0} - G_{x0} \cdot V_{x0} \cdot (t-t_0) - G_{y0} \cdot V_{y0} \cdot (t-t_0) = \quad (4)$$

$$I_{t0} + G_{x0} \cdot V_{x0} + G_{y0} \cdot V_{y0}$$

$$I_t = I_{t1} - G_{x1} \cdot V_{x1} \cdot (t-t_1) - G_{y1} \cdot V_{y1} \cdot (t-t_1) =$$

$$I_{t1} - G_{x1} \cdot V_{x1} - G_{y1} \cdot V_{y1}$$

$$I_t = \frac{I_{t0} + I_{t1}}{2} + \frac{(G_{x0} \cdot V_{x0} - G_{x1} \cdot V_{x1}) + (G_{y0} \cdot V_{y0} - G_{y1} \cdot V_{y1})}{2}$$

It is further assumed $V_{x0} = V_{x1} = V_x$ and $V_{y0} = V_{y1} = V_y$ since the motion is along the trajectory. So (4) becomes $$I_t = \frac{I_{t0} + I_{t1}}{2} + \frac{(G_{x0} - G_{x1}) \cdot V_x + (G_{y0} - G_{y1}) \cdot V_y}{2} = \quad (5)$$

$$\frac{I_{t0} + I_{t1}}{2} + \frac{\Delta G_x \cdot V_x + \Delta G_y \cdot V_y}{2}$$

where $\Delta G_x = G_{x0} - G_{x1}$, $\Delta G_y = G_{y0} - G_{y1}$ can be calculated based on reconstructed references. Since $$\frac{I_{t0} + I_{t1}}{2}$$

is the regular bi-prediction, $$\frac{\Delta G_x \cdot V_x + \Delta G_y \cdot V_y}{2}$$

is called BIO offset hereafter for convenience.

$V_x$ and $V_y$ are derived at both encoder and decoder by minimizing the following distortion:

$$\min\left\{\sum_{block} ((I_{t0} + G_{x0} \cdot V_x + G_{y0} \cdot V_y) - (I_{t1} - G_{x1} \cdot V_x - G_{y1} \cdot V_y))^2\right\} =$$

$$\min\left\{\sum_{block} (\Delta I + (G_{x0} + G_{x1}) \cdot V_x + (G_{y0} + G_{y1}) \cdot V_y)^2\right\}$$

With derived $V_x$ and $V_y$, the final prediction of the block is calculated with (5). $V_x$ and $V_y$ is called "BIO motion" for convenience.

In general, a video coder performs BIO during motion compensation. That is, after the video coder determines a motion vector for a current block, the video coder produces a predicted block for the current block using motion compensation with respect to the motion vector. In general, the motion vector identifies the location of a reference block with respect to the current block in a reference picture. When performing BIO, a video coder modifies the motion vector on a per-pixel basis for the current block. That is, rather than retrieving each pixel of the reference block as a block unit, according to BIO, the video coder determines per-pixel modifications to the motion vector for the current block, and constructs the reference block such that the reference block includes reference pixels identified by the motion vector and the per-pixel modification for the corresponding pixel of the current block. Thus, BIO may be used to produce a more accurate reference block for the current block.

This disclosure describes techniques that may improve techniques related to BIO according to, e.g., Alshina 1 and Alshina 2. For example, this disclosure describes techniques that may further improve coding efficiency of video codecs, e.g., relating to performance of BIO. For example, according to Alshina 1 and Alshina 2, BIO can only be applied to a block which has both forward and backward prediction. In addition, BIO may lead to loss when there is an illumination change. Furthermore, BIO may not be stable, especially for noisy sequences. The techniques of this disclosure may overcome these issues and improve performance of BIO.

FIG. 1 is a block diagram illustrating an example video encoding and decoding system 10 that may utilize techniques for bi-directional optical flow. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for bi-directional optical flow. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for bi-directional optical flow may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard, also referred to as ITU-T H.265. Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

In general, according to ITU-T H.265, a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, prediction unit (PU), or transform unit (TU), in the context of HEVC, or similar data structures in the context of other standards (e.g., macroblocks and sub-blocks thereof in H.264/AVC).

A CU includes a coding node and may include one or more prediction units (PUs) and/or transform units (TUs) associated with the coding node. A size of the CU corresponds to a size of the coding node and is generally square in shape. The size of the CU may range from 8×8 pixels up to the size of the treeblock with a maximum size, e.g., 64×64 pixels or greater. Each CU may contain one or more PUs and/or one or more TUs. Syntax data associated with a CU may describe, for example, partitioning of the CU into sub-CUs, partitions, or one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more PUs. In general, a PU represents a spatial area corresponding to all or a portion of the corresponding CU, and may include data for retrieving and/or generating a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. The RQT may also be referred to as a transform tree. In some examples, the intra-prediction mode may be signaled in the leaf-CU syntax, instead of the RQT. As another example, when the PU is inter-mode encoded, the PU may include data defining motion information, such as one or more motion vectors, for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0 or List 1) for the motion vector.

A leaf-CU may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, prediction may be performed for PUs of various sizes. Assuming that the size of a particular CU is 2N×2N, intra-prediction may be performed on PU sizes of 2N×2N or N×N, and inter-prediction may be performed on symmetric PU sizes of 2N×2N, 2N×N, N×2N, or N×N. Asymmetric partitioning for inter-prediction may also be performed for PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs or CU partitions. Video encoder 20 may form the TUs to include quantized transform coefficients representative of the residual data for the CU. That is, video encoder 20 may calculate the residual data (in the form of a residual block), transform the residual block to produce a block of transform coefficients, and then quantize the transform coefficients to form quantized transform coefficients. Video encoder 20 may form a TU including the quantized transform coefficients, as well as other syntax information (e.g., splitting information for the TU).

As noted above, following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In general, video decoder 30 performs a substantially similar, albeit reciprocal, process to that performed by video encoder 20 to decode encoded data. For example, video decoder 30 inverse quantizes and inverse transforms coefficients of a received TU to reproduce a residual block. Video decoder 30 uses a signaled prediction mode (intra- or inter-prediction) to form a predicted block. Then video decoder 30 combines the predicted block and the residual block (on a pixel-by-pixel basis) to reproduce the original block. Additional processing may be performed, such as performing a deblocking process to reduce visual artifacts along block boundaries. Furthermore, video decoder 30 may decode syntax elements using CABAC in a manner substantially similar to, albeit reciprocal to, the CABAC encoding process of video encoder 20.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

In accordance with the techniques of this disclosure, video encoder 20 and/or video decoder 30 may further perform bi-directional optical flow (BIO) techniques during motion compensation as discussed in greater detail below. In general, video encoder 20 and/or video decoder 30 may apply BIO to blocks having two different reference pictures in the same reference picture list (e.g., both reference pictures in List 0 (RefPicList0) or List 1 (RefPicList1). In addition or in the alternative, video encoder 20 and/or video decoder 30 may apply special processes during BIO performed for blocks in a region of illumination change. In addition or in the alternative, video encoder 20 and/or video decoder 30 may be configured according to certain restrictions to avoid negative impacts that may otherwise be caused by noise during BIO.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Figure 2:
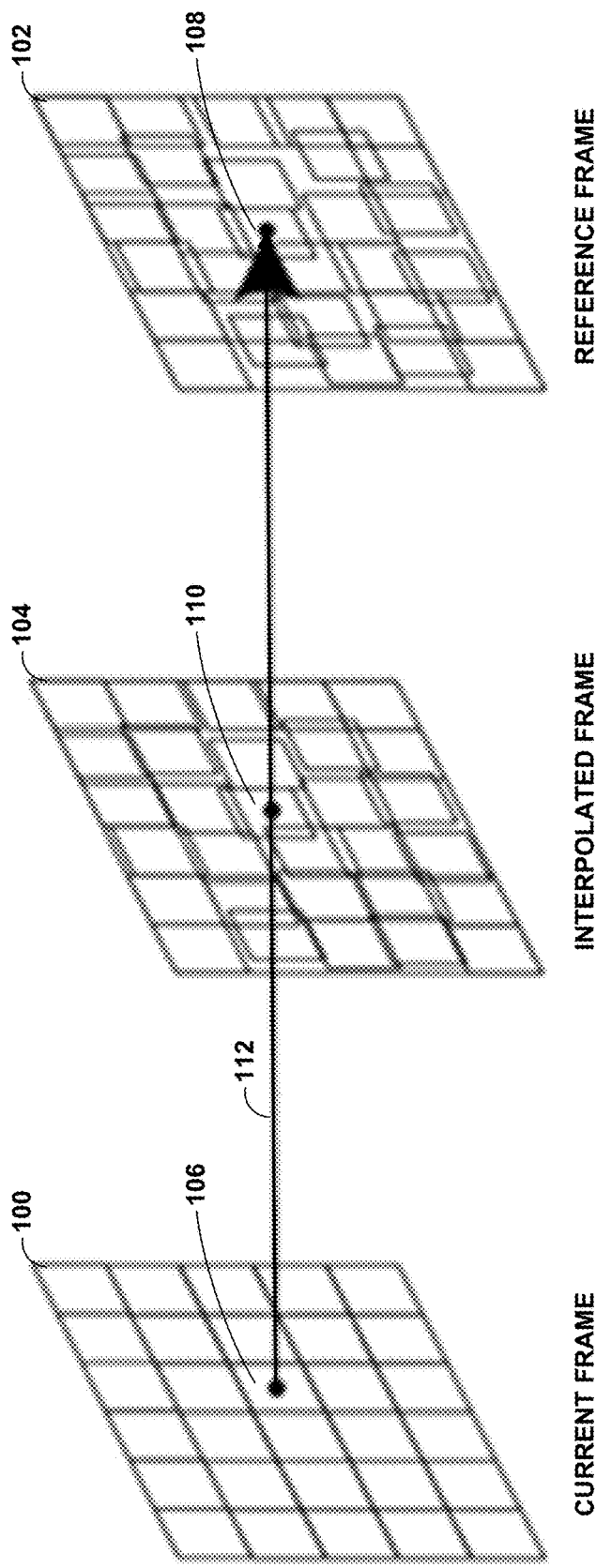
FIG. 2 is a conceptual diagram illustrating an example of unilateral motion estimation (ME) as a block-matching algorithm (BMA) performed for motion compensated frame-rate up-conversion (MC-FRUC).

FIG. 2 is a conceptual diagram illustrating an example of unilateral motion estimation (ME) as a block-matching algorithm (BMA) performed for motion compensated frame-rate up-conversion (MC-FRUC). In general, a video coder (such as video encoder 20 or video decoder 30) performs unilateral ME to obtain motion vectors (MVs), such as MV 112, by searching for the best matching block (e.g., reference block 108) from reference frame 102 for current block 106 of current frame 100. Then, the video coder interpolates an interpolated block 110 along the motion trajectory of motion vector 112 in interpolated frame 104. That is, in the example of FIG. 2, motion vector 112 passes through midpoints of current block 106, reference block 108, and interpolated block 110.

As shown in FIG. 2, three blocks in three frames are involved following the motion trajectory. Although current block 106 in current frame 100 belongs to a coded block, the best matching block in reference frame 102 (that is, reference block 108) need not fully belong to a coded block (that is, the best matching block might not fall on a coded block boundary, but instead, may overlap such a boundary). Likewise, interpolated block 110 in interpolated frame 104 need not fully belong to a coded block. Consequently, overlapped regions of the blocks and un-filled (holes) regions may occur in interpolated frame 104.

To handle overlaps, simple FRUC algorithms merely involve averaging and overwriting the overlapped pixels. Moreover, holes may be covered by the pixel values from a reference or a current frame. However, these algorithms may result in blocking artifacts and blurring. Hence, motion field segmentation, successive extrapolation using the discrete Hartley transform, and image inpainting may be used to handle holes and overlaps without increasing blocking artifacts and blurring.

Figure 3:
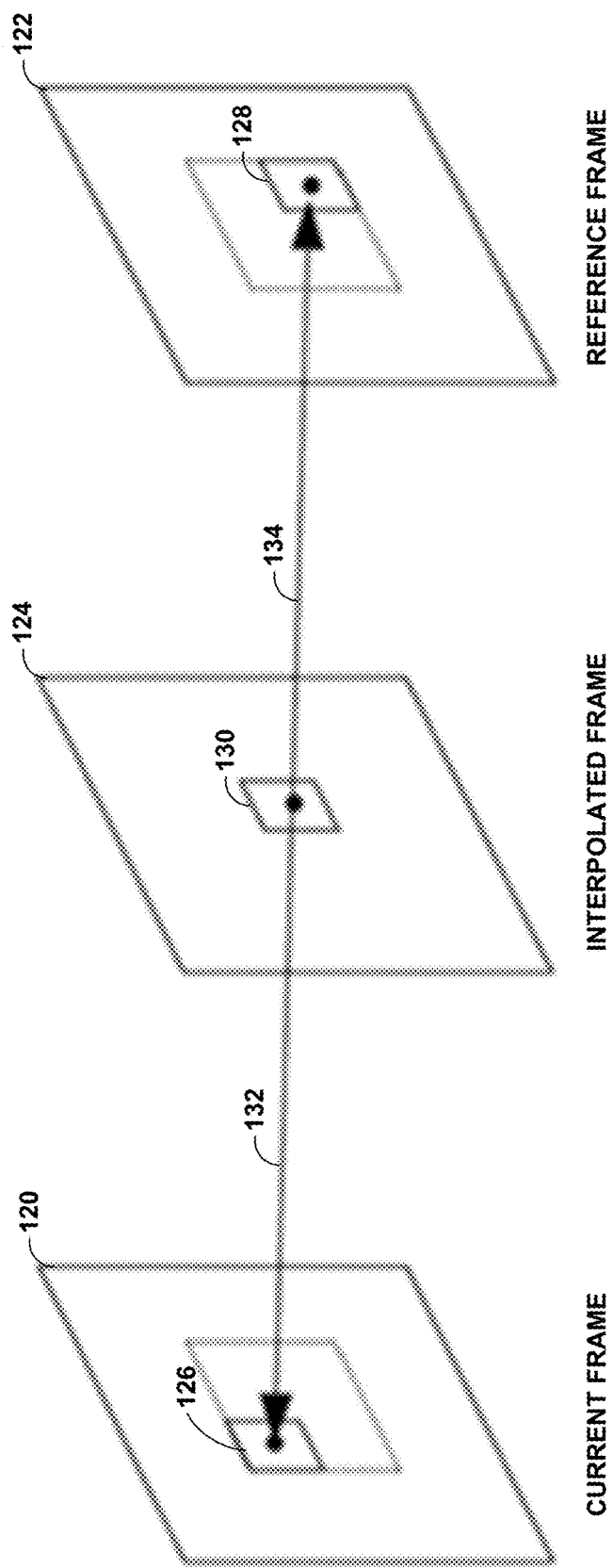
FIG. 3 is a conceptual diagram illustrating an example of bilateral ME as a BMA performed for MC-FRUC.

FIG. 3 is a conceptual diagram illustrating an example of bilateral ME as a BMA performed for MC-FRUC. Bilateral ME is another solution (in MC-FRUC) that can be used to avoid the problems caused by overlaps and holes. A video coder (such as video encoder 20 and/or video decoder 30) performing bilateral ME obtains MVs 132, 134 passing through interpolated block 130 of interpolated frame 124 (which is intermediate to current frame 120 and reference frame 122) using temporal symmetry between current block 126 of current frame 120 and reference block 128 of reference frame 122. As a result, the video coder does not generate overlaps and holes in interpolated frame 124. Since it is assumed that current block 126 is a block that the video coder processes in a certain order, e.g., as in the case of video coding, a sequence of such blocks would cover the whole intermediate picture without overlap. For example, in the case of video coding, blocks can be processed in the decoding order. Therefore, such a method may be more suitable if FRUC ideas can be considered in a video coding framework.

S.-F. Tu, O. C. Au, Y. Wu, E. Luo and C.-H. Yeun, "A Novel Framework for Frame Rate Up Conversion by Predictive Variable Block-Size Motion Estimated Optical Flow," International Congress on Image Signal Processing (CISP), 2009 described a hybrid block-level motion estimation and pixel-level optical flow method for frame rate up-conversion. Tu stated that the hybrid scene was better than either individual method.

Figure 4:
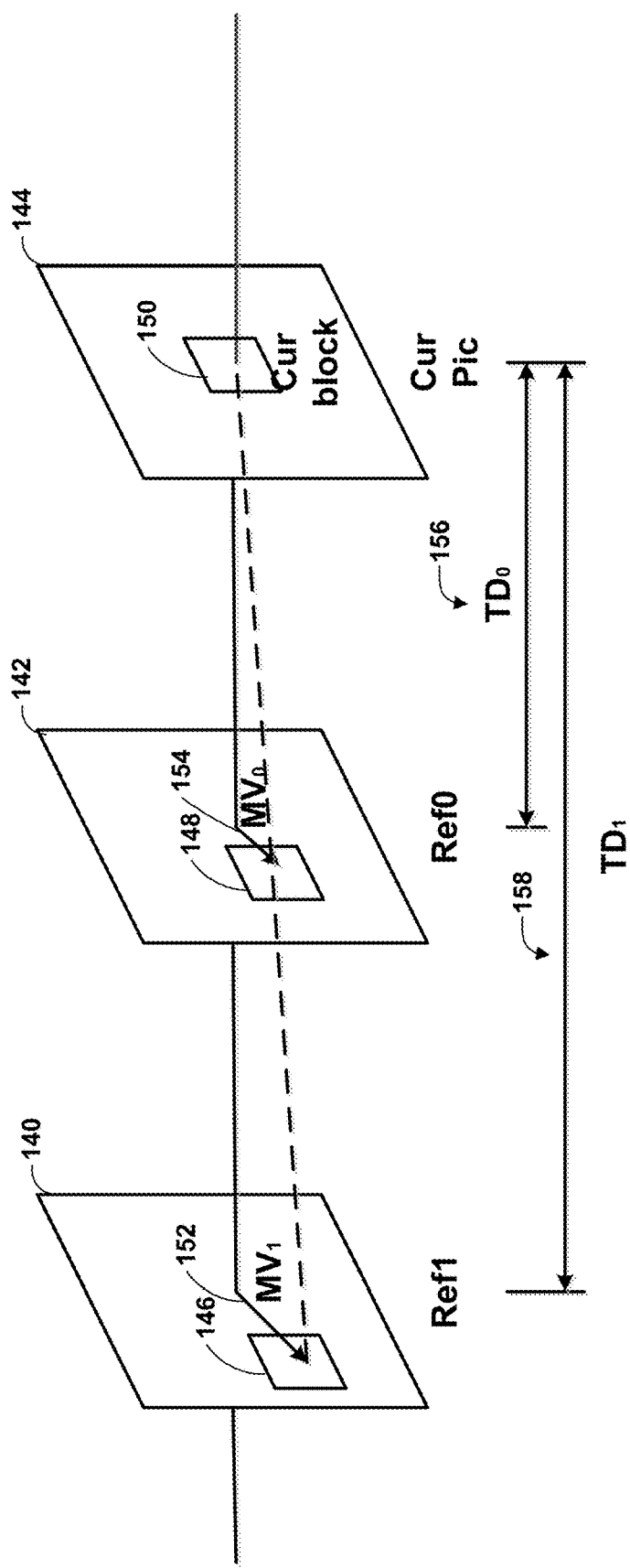
FIG. 4 is a conceptual diagram illustrating an example improvement to bi-directional optical flow (BIO) in accordance with the techniques of this disclosure.

FIG. 4 is a conceptual diagram illustrating an example improvement to BIO in accordance with the techniques of this disclosure. One example technique of this disclosure involves applying BIO to blocks that have two different reference pictures that are both temporally before the current picture or are both temporally after the current picture (e.g., that are in the same reference picture list, such as List 0 or List 1) and have two motion vectors that are in proportion to, or almost in proportion to, the temporal distance between the current picture and the reference pictures. "In proportion to temporal distance" and "almost in proportion to temporal distance" may be defined as follows: Let $TD_0$ and $TD_1$ be the temporal distance between the current picture and Ref0 and Ref1, respectively, such as shown in FIG. 4.

"In proportion to temporal distance" may be defined as shown in formula (6) below:

$$|MV_{0x}*TD_1 - MV_{1x}*TD_0| == 0 \&\& |MV_{0y}*TD_1 - MV_{1y}*TD_0| == 0 \quad (6)$$

"Almost in proportion to temporal distance" may be defined as shown in formula (7) below:

$$|MV_{0x}*TD_1 - MV_{1x}*TD_0| <= Th \;\&\&\; |MV_{0y}*TD_1 - MV_{1y}*TD_0| <= Th \quad (7)$$

Th represents a threshold value, which may be predefined or signaled in the bitstream. For example, Th may be signaled in a sequence parameter set (SPS), a picture parameter set (PPS), a slice header, block-level syntax data, or the like. Let "Cur" represent the current picture, "Ref0" represent a first reference picture, and "Ref1" represent a second reference picture. $MV_{0x}$ and $MV_{0y}$ represent the x-component and the y-component, respectively, of a motion vector ($MV_0$) from a current block of Cur to Ref0. $MV_{1x}$ and $MV_{1y}$ represent the x-component and the y-component, respectively, of a motion vector ($MV_1$) from the current block to Ref1. $TD_0$ represents the temporal distance between Cur and Ref0 (e.g., the difference between a POC value for Cur and a POC value for Ref0). $TD_1$ represents a temporal distance between Cur and Ref1 (e.g., the difference between the POC value for Cur and a POC value for Ref1).

Moreover, formula (4) above may be modified such that $(t-t_0)$ is replaced with $TD_0$ as discussed above, and (t-t1) is replaced with TD1 as discussed above. Thus, formula (4) above may be replaced with formula (4') as shown below:

$$I_t = I_{t0} - G_{x0} \cdot V_{x0} \cdot (t-t_0) - G_{y0} \cdot V_{y0} \cdot (t-t_0) = \quad (4')$$
$$I_{t0} + G_{x0} \cdot V_{x0} \cdot TD_0 + G_{y0} \cdot V_{y0} \cdot TD_0$$
$$I_t = I_{t1} - G_{x1} \cdot V_{x1} \cdot (t-t_1) - G_{y1} \cdot V_{y1} \cdot (t-t_1) =$$
$$I_{t1} - G_{x1} \cdot V_{x1} \cdot TD_1 - G_{y1} \cdot V_{y1} \cdot TD_1$$
$$I_t = \frac{I_{t0} + I_{t1}}{2} + \frac{(G_{x0} \cdot V_{x0} \cdot TD_0 - G_{x1} \cdot V_{x1} \cdot TD_1) + (G_{y0} \cdot V_{y0} \cdot TD_0 - G_{y1} \cdot V_{y1} \cdot TD_1)}{2}$$

In particular, the example of FIG. 4 illustrates current picture 144 including current block 150. Current block 150 is predicted from reference block 148 of reference picture 142 using motion vector 154 and from reference block 146 of reference picture 140 using motion vector 152. Reference picture 140 and reference picture 142 occur in the same temporal direction relative to current picture 144. That is, in this example, reference picture 140 and reference picture 142 are each displayed before current picture 144. In other examples, two reference pictures may occur after (that is, be displayed after) a current picture, yet the techniques of this disclosure may still be applied in such examples. Furthermore, reference picture 140 has a temporal distance of $TD_1$ 158 from current picture 144. $TD_1$ 158 may be equal to a difference between a picture order count (POC) value for current picture 144 and a POC value for reference picture 140. Similarly, reference picture 142 has a temporal distance of $TD_0$ 156 from current picture 144. That is, $TD_0$ 156 may be equal to a difference between the POC value for current picture 144 and a POC value for reference picture 142.

In accordance with the techniques of this disclosure, in the example of FIG. 4, a video coder (such as video encoder 20 or video decoder 30) may determine whether motion vectors 154, 152 are in proportion to, or almost in proportion to, $TD_0$ 156 and $TD_1$ 158, respectively. For example, the video coder may execute formulas (6) and/or (7) above using x- and y-values of motion vectors 152, 154 and values for temporal distances $TD_0$ 156 and $TD_1$ 158. In response to determining that motion vectors 154, 152 are in proportion to $TD_0$ 156 and $TD_1$ 158 (e.g., using formula (6)) or almost in proportion to $TD_0$ 156 and $TD_1$ 158 (e.g., using formula (7)), the video coder may perform BIO when predicting current block 150. Alternatively, in response to determining that motion vectors 154, 152 are not in proportion to $TD_0$ 156 and $TD_1$ 158 (e.g., using formula (6)) or not almost in proportion to $TD_0$ 156 and $TD_1$ 158 (e.g., using formula (7)), the video coder may avoid performing BIO when predicting current block 150.

Figure 5:
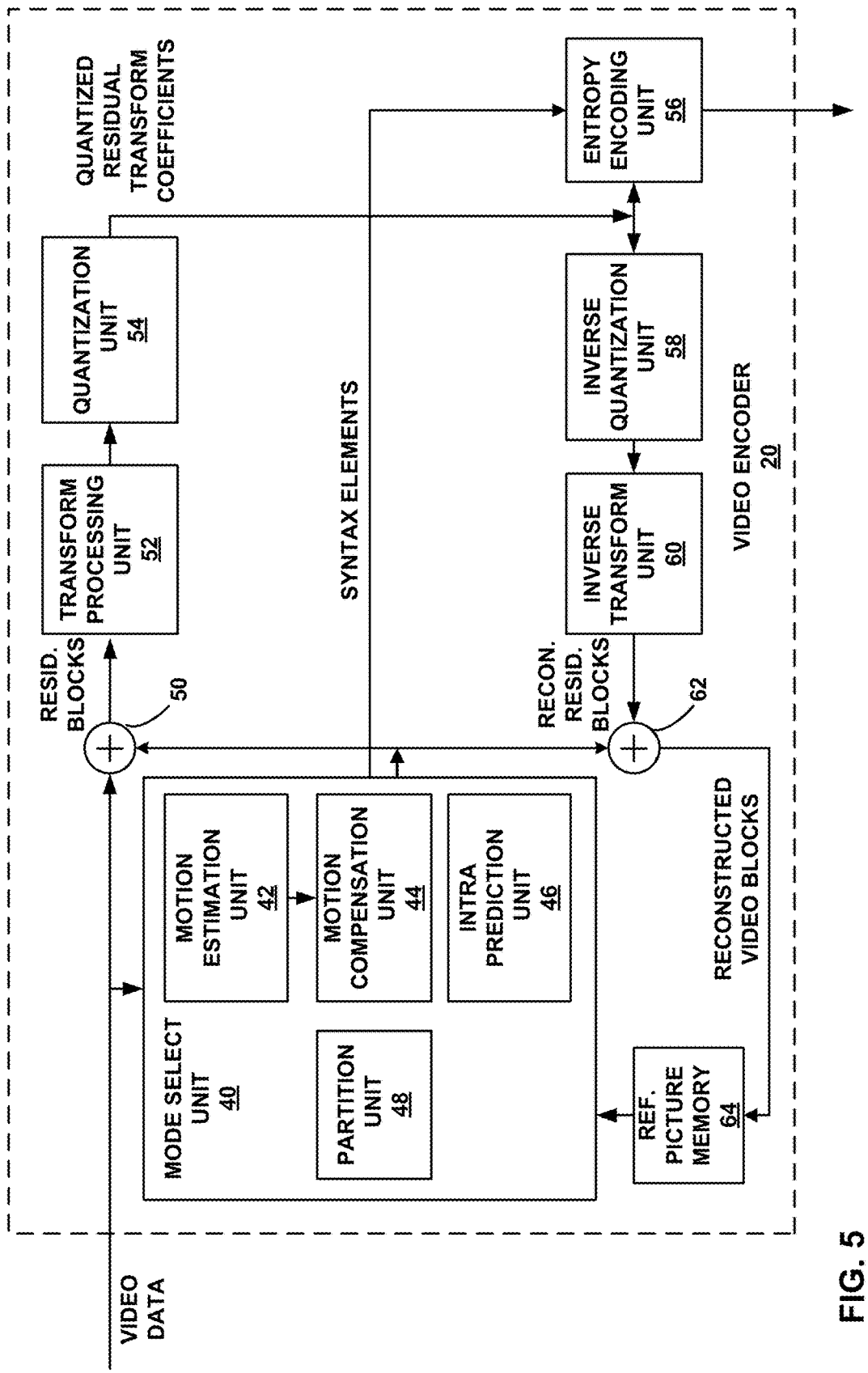
FIG. 5 is a block diagram illustrating an example of a video encoder.

FIG. 5 is a block diagram illustrating an example of video encoder 20 that may implement techniques for bi-directional optical flow. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 5, video encoder 20 receives a current video block within a video frame to be encoded. In the example of FIG. 5, video encoder 20 includes mode select unit 40, reference picture memory 64 (which may also be referred to as a decoded picture buffer (DPB)), summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 5) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive encoding of the received video block relative to one or more blocks in one or more reference frames to provide temporal prediction. Intra-prediction unit 46 may alternatively intra-predict the received video block using pixels of one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the prediction modes, intra or inter, e.g., based on error results, and provides the resulting predicted block to summer 50 to generate residual data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Furthermore, motion compensation unit 44 may be configured to perform any or all of the techniques of this disclosure (alone or in any combination). Although discussed with respect to motion compensation unit 44, it should be understood that mode select unit 40, motion estimation unit 42, partition unit 48, and/or entropy encoding unit 56 may also be configured to perform certain techniques of this disclosure, alone or in combination with motion compensation unit 44. In one example, motion compensation unit 44 may be configured to perform the BIO techniques discussed above with respect to FIG. 4, and as discussed in greater detail below.

For example, motion compensation unit 44 may be configured to apply BIO to blocks that have two different reference pictures that are either both temporally before the current picture (e.g., both in Reference Picture List 0) or both temporally after the current picture (e.g., both in Reference Picture List 1), where the blocks have two motion vectors that are at least almost in proportion to (e.g., in proportion to or almost in proportion to) the temporal distances between the current picture and the reference pictures.

In one example, motion compensation unit 44 may be configured with a threshold (Th), or may determine a value representative of Th and encode the value in the video bitstream (e.g., in an SPS, a PPS, a slice header, or block level syntax). Motion compensation unit 44 may then execute formula (7) to determine whether the motion vectors for a current block of a current picture are almost in proportion to temporal distances to corresponding reference pictures. When the motion vectors for the current block are almost in proportion to the temporal distances to the corresponding reference pictures for the current block, motion compensation unit 44 may apply the BIO techniques discussed above to the block. In particular, motion compensation unit 44 may apply the BIO techniques when forming a predicted block for the current block, which motion compensation unit 44 would then provide to, e.g., summer 50 and summer 62.

As another example (which may be in addition or in the alternative to the example discussed above using formula (7)), motion compensation unit 44 may be configured to execute formula (6) to determine whether the motion vectors for a current block are in proportion to temporal distances to corresponding reference pictures. When the motion vectors for the current block are in proportion to the temporal distances to the corresponding reference pictures for the current block, motion compensation unit 44 may apply the BIO techniques discussed above to the block.

In some examples, motion compensation unit 44 may be constrained such that, for either of the techniques discussed above (relating to formulas (6) and (7)), the techniques are performed only when the two motion vectors are non-zero. That is, motion compensation unit 44 may determine whether the two motion vectors (e.g., motion vectors received from motion estimation unit 42) are non-zero. If both of the motion vectors are non-zero, motion compensation unit 44 may proceed to perform the BIO techniques discussed above when predicting the block. However, if at least one of the motion vectors is zero-valued, motion compensation unit 44 may avoid performing the BIO techniques when predicting the block. Motion compensation unit 44 may perform this determination in addition or in the alternative to the determinations of whether the motion vectors are in proportion, or almost in proportion, to the temporal distances, as discussed above.

In some examples, motion compensation unit 44 may further take account of temporal distances when calculating gradients $G_x$ and $G_y$. In particular, motion compensation unit 44 may calculate modified gradients $G_x'$ and $G_y'$ from the normally calculated gradients $G_x$ and $G_y$, where such modifications are based on the respective temporal distances. For example, motion compensation unit 44 may calculate the modified gradient $G_x'$ and $G_y'$ as the product of the true gradient $G_x$ and $G_y$ and the temporal distance $TD_0$ and $TD_1$, such as $G_x'=G_x \cdot TD_0$ and $G_y'=G_y \cdot TD_1$. Motion compensation unit 44 may also calculate the modified gradient as the product of the true gradient and a factor related to the temporal distance between the reference and current pictures.

Additionally or alternatively, motion compensation unit 44 (or mode select unit 40) may determine whether a block is in a region of illumination change, e.g., where video encoder 20 sets a value of "true" for an illumination compensation flag (ic_flag). Motion compensation unit 44 may apply a special process for BIO to a block that is in a region of illumination change. In some examples, motion compensation unit 44 does not apply BIO to a block when the block is in a region of illumination compensation change. Alternatively, motion compensation unit 44 may apply BIO after illumination compensation, and moreover, the illumination compensation may also be applied when calculating block gradients for BIO. Alternatively, another flag may be signaled for a block to indicate whether BIO is applied to the block if the illumination compensation coding tool is not enabled.

Additionally or alternatively, motion compensation unit 44 may be restricted regarding BIO, e.g., to avoid negative impacts caused by signal noise. For example, motion compensation unit 44 may be configured with either or both of the following restrictions. The range of a BIO offset (defined below expression (5), above) may be restricted. The maximal and/or minimal values may be predefined or determined and then signaled (e.g., in an SPS, a PPS, a slice header, or block-level syntax). Alternatively, the maximal and minimal values relative to the regular bi-prediction in expression (5) may be predefined or determined and then signaled. Additionally or alternatively, the range of the gradient calculated during BIO process may be restricted based on predefined values or determined and then signaled values.

Additionally or alternatively, motion compensation unit 44 may first assess the reliability of motion vectors derived as part of the BIO process. When the reliability of BIO motion vectors for a pixel or a block is low, motion compensation unit 44 may avoid adding the BIO offset, or may apply a smaller weight to the BIO offset when adding the BIO offset. Motion compensation unit 44 may derive the reliability of a motion vector for a pixel by analyzing the relation of its BIO motion and the BIO motion of its neighboring pixels. For example, when one or more deviations between the BIO motion for a current pixel and the BIO motion for neighboring pixels to the current pixel are large, motion compensation unit 44 may determine that the reliability of the BIO motion for the current pixel is low. Additionally or alternatively, motion compensation unit 44 may derive the reliability of a block by analyzing the BIO motion of the pixels within the block. For example, when the deviation of BIO motion within a block is large, the reliability of the current BIO motion may be deemed to be low. Additionally or alternatively, motion compensation unit 44 may derive the reliability of BIO motion based on analyzing the pixel sample values. For example, motion compensation unit 44 may estimate the noise level, and then determine that the reliability of BIO motion is low when the noise level is high. Motion compensation unit 44 may apply multiple methods (which may include any or all of the methods discussed above) together, in any combination, to derive the reliability of BIO motion.

In response to determining to apply BIO to a block (according to any or all of the techniques discussed above, alone or in any combination), motion compensation unit 44 may apply the techniques discussed above (e.g., with respect to formulas (1) to (5) above) to predict the block according to BIO.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising transform coefficient values. Wavelet transforms, integer transforms, sub-band transforms, discrete sine transforms (DSTs), or other types of transforms could be used instead of a DCT. In any case, transform processing unit 52 applies the transform to the residual block, producing a block of transform coefficients. The transform may convert the residual information from a pixel domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain. In particular, summer 62 adds the reconstructed residual block to the motion compensated prediction block earlier produced by motion compensation unit 44 or intra-prediction unit 46 to produce a reconstructed video block for storage in reference picture memory 64. The reconstructed video block may be used by motion estimation unit 42 and motion compensation unit 44 as a reference block to inter-code a block in a subsequent video frame.

Figure 6:
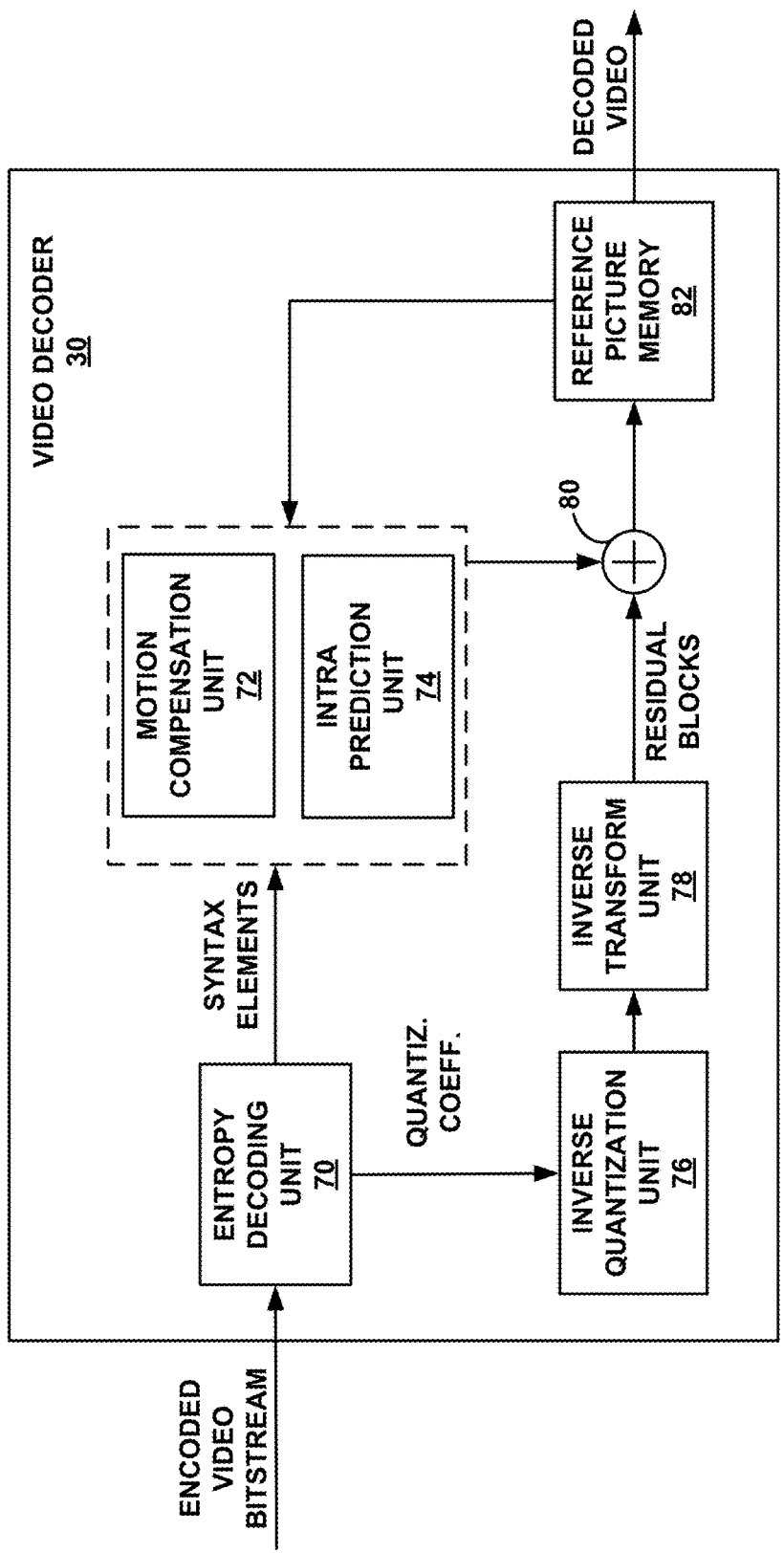
FIG. 6 is a block diagram illustrating an example of a video decoder that may implement techniques for bi-directional optical flow.

FIG. 6 is a block diagram illustrating an example of video decoder 30 that may implement techniques for bi-directional optical flow. In the example of FIG. 6, video decoder 30 includes an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 5) or video encoder 20' (FIG. 5B). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters for sub-pixel precision. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Furthermore, motion compensation unit 72 may be configured to perform any or all of the techniques of this disclosure (alone or in any combination). For example, motion compensation unit 72 may be configured to perform the BIO techniques discussed above with respect to FIG. 4, and as discussed in greater detail below.

For example, motion compensation unit 72 may be configured to apply BIO to blocks that have two different reference pictures that are either both temporally before the current picture (e.g., both in Reference Picture List 0) or both temporally after the current picture (e.g., both in Reference Picture List 1), where the blocks have two motion vectors that are at least almost in proportion to (e.g., in proportion to or almost in proportion to) the temporal distances between the current picture and the reference pictures.

In one example, motion compensation unit 72 may be configured with a threshold (Th), or may decode a value representative of Th from the bitstream (e.g., in an SPS, a PPS, a slice header, or block level syntax). Motion compensation unit 72 may then execute formula (7) to determine whether the motion vectors for a current block are almost in proportion to temporal distances to corresponding reference pictures. When the motion vectors for the current block are almost in proportion to the temporal distances to the corresponding reference pictures for the current block, motion compensation unit 72 may apply the BIO techniques discussed above to the block. In particular, motion compensation unit 72 may apply the BIO techniques when forming a predicted block for the current block, which motion compensation unit 44 would then provide to, e.g., summer 80.

As another example, motion compensation unit 72 may be configured to execute formula (6) to determine whether the motion vectors for a current block are in proportion to temporal distances to corresponding reference pictures. When the motion vectors for the current block are in proportion to the temporal distances to the corresponding reference pictures for the current block, motion compensation unit 72 may apply the BIO techniques discussed above to the block.

In some examples, motion compensation unit 72 may be constrained such that, for either of the techniques discussed above (relating to formulas (6) and (7)), the techniques are performed only when the two motion vectors are non-zero. That is, motion compensation unit 72 may determine whether the two motion vectors decoded by entropy decoding unit 70 are non-zero. If both of the motion vectors are non-zero, motion compensation unit 72 may proceed to perform the BIO techniques discussed above when predicting the block. However, if at least one of the motion vectors is zero-valued, motion compensation unit 72 may avoid performing the BIO techniques when predicting the block. Motion compensation unit 72 may perform this determination in addition or in the alternative to the determinations of whether the motion vectors are in proportion, or almost in proportion, to the temporal distances, as discussed above.

In some examples, motion compensation unit 72 may further consider take account of temporal distances when applying BIO. In formula (4), temporal distance $TD_0$ and $TD_1$ are assumed as equal, which is not always true. One particular way to take temporal distances into account is that, motion compensation unit 72 may calculate modified gradients $G_x'$ and $G_y'$ from the normally calculated gradients $G_x$ and $G_y$, where such modifications are based on the respective temporal distances. For example, motion compensation unit 72 may calculate the modified gradient $G_x'$ and $G_y'$ as the product of the true gradient $G_x$ and $G_y$ and the temporal distance $TD_0$ and $TD_1$, such as $G_x'=G_x \cdot TD_0$ and $G_y'=G_y \cdot TD_1$. In particular, from the equations above, TD0 may be calculated as t0−t, while TD1 may be calculated as t−t1. Thus, rather than assuming Δt is equal to 1 for both TD0 and TD1, the true temporal distances between the current picture and the reference pictures may be used, e.g., as shown in formula (4'). Motion compensation unit 72 may also calculate the modified gradient as the product of the true gradient and a factor related to the temporal distance between the reference and current pictures.

Additionally or alternatively, motion compensation unit 72 may apply a special process for BIO to a block that is indicated as being in a region of illumination change, such as when the block includes an illumination compensation flag (ic_flag) having a value of true. In some examples, motion compensation unit 72 does not apply BIO to a block when the block is in a region of illumination compensation change. Alternatively, motion compensation unit 72 may apply BIO after illumination compensation, and moreover, the illumination compensation may also be applied when calculating block gradients for BIO.

Additionally or alternatively, motion compensation unit 72 may be restricted regarding BIO, e.g., to avoid negative impacts caused by signal noise. For example, motion compensation unit 72 may be configured with either or both of the following restrictions. The range of a BIO offset (defined below expression (5), above) may be restricted. The maximal and/or minimal values may be predefined or signaled (e.g., in an SPS, a PPS, a slice header, or block-level syntax). Alternatively, the maximal and minimal values relative to the regular bi-prediction in expression (5) may be predefined or signaled. Additionally or alternatively, the range of the gradient calculated during BIO process may be restricted based on predefined values or signaled values.

Additionally or alternatively, motion compensation unit 72 may first assess the reliability of motion vectors derived by BIO. When the reliability of BIO motion vectors for a pixel or a block is low, motion compensation unit 72 may avoid adding the BIO offset, or may apply a smaller weight to the BIO offset when adding the BIO offset. Motion compensation unit 72 may derive the reliability of a motion vector for a pixel by analyzing the relation of its BIO motion and the BIO motion of its neighboring pixels. For example, when the deviation between the current BIO motion and the neighboring BIO motion is large, the reliability of the current BIO motion may be deemed to be low. Additionally or alternatively, motion compensation unit 72 may derive the reliability of a block by analyzing the BIO motion of the pixels within the block. For example, when the deviation of BIO motion within a block is large, the reliability of the current BIO motion may be deemed to be low. Additionally or alternatively, motion compensation unit 72 may derive the reliability of BIO motion based on analyzing the pixel sample values. For example, the noise level might be estimated, and then the reliability of BIO motion may be deemed to be low when the noise level is high. Multiple methods (which may include any or all of the methods discussed above) may be applied together, in any combination, to derive the reliability of BIO motion.

In response to determining to apply BIO to a block (according to any or all of the techniques discussed above, alone or in any combination), motion compensation unit 72 may apply the techniques discussed above (e.g., with respect to formulas (1) to (5) above) to predict the block according to BIO.

Inverse quantization unit 76 inverse quantizes, i.e., de-quantizes, the quantized transform coefficients provided in the bitstream and decoded by entropy decoding unit 70. The inverse quantization process may include use of a quantization parameter QPy calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1. For example, reference picture memory 82 may store decoded pictures.

Figure 7:
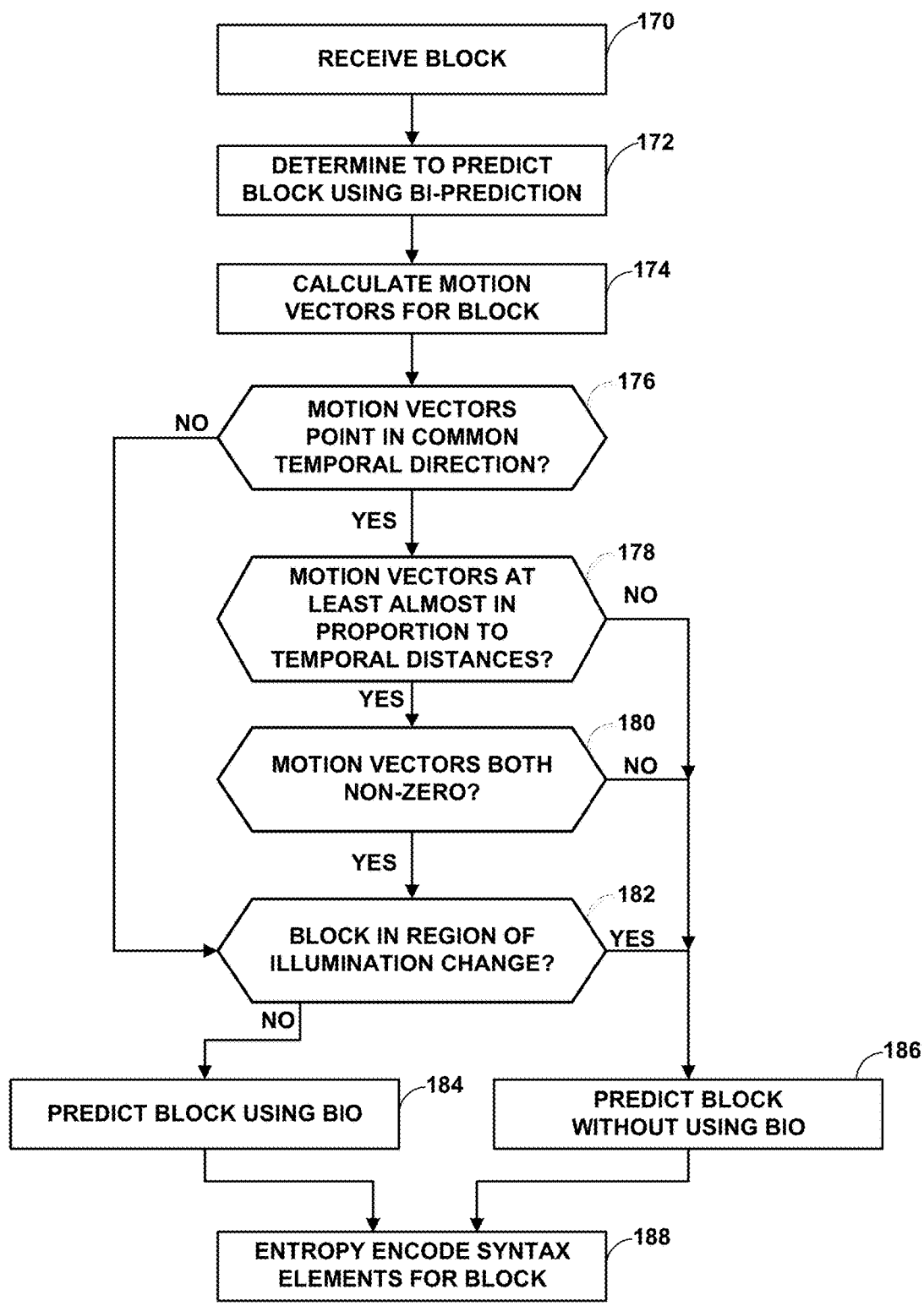
FIG. 7 is a flowchart illustrating an example method for predicting a block of video data in accordance with the techniques of this disclosure.

FIG. 7 is a flowchart illustrating an example method for predicting a block of video data in accordance with the techniques of this disclosure. The method of FIG. 7 is explained with respect to video encoder 20 of FIGS. 1 and 5. However, it should be understood that in other examples, other devices may be configured to perform the method of FIG. 7.

It is presumed that video encoder 20 initially encodes, and then subsequently decodes, pictures for use as reference pictures, stored in reference picture memory 64 (FIG. 5), although these steps are not illustrated in the example of FIG. 7. Video encoder 20 then receives a block of video data (170). The block may be, for example, a prediction unit (PU) of a coding unit (CU) of a current picture (or a slice of the picture) of video data. Video encoder 20 may determine which of a variety of prediction modes to use to predict the block, such as intra-prediction or inter-prediction, and if inter-prediction is determined, whether to use uni-directional or bi-directional inter-prediction. In the example of FIG. 7, video encoder 20 determines to predict the block using bi-prediction (172). For example, video encoder 20 (in particular, mode select unit 40 of FIG. 5) may calculate rate-distortion metrics for various possible prediction modes (e.g., one or more intra-prediction modes and uni- or bi-directional prediction from the various decoded reference pictures stored in reference picture memory 64) and determine that bi-prediction yields the best rate-distortion metrics for the block.

Video encoder 20 (in particular, motion estimation unit 42 of FIG. 5) may further calculate motion vectors for the block according to bi-prediction (174). Such motion vectors may refer to reference pictures that are both to be displayed before the current picture, both to be displayed after the current picture, or one to be displayed before the current picture and another to be displayed after the current picture. For example, the reference pictures may both occur in reference picture list 0, both occur in reference picture list 1, or one may occur in reference picture list 0 and the other may occur in reference picture list 1.

In this example, video encoder 20 determines whether the motion vectors for the block point in a common temporal direction (176). That is, video encoder 20 determines whether the motion vectors refer to reference pictures that both are to be displayed before or after the current picture, e.g., whether the reference pictures occur in the same reference picture list (such as list 0 or list 1).

If the two motion vectors point in a common temporal direction ("YES" branch of 176), video encoder 20 may further determine whether the motion vectors are at least almost in proportion to temporal distances between the current picture and the corresponding reference pictures (178). The temporal distances may correspond to differences between picture order count (POC) values for the current picture and the two reference pictures. "At least almost in proportion" generally refers to either being almost in proportion to the temporal distances, or in proportion to the temporal distances. Video encoder 20 may execute formulas (6) and/or (7) as discussed above to determine whether the motion vectors are at least almost in proportion to the temporal distances.

For example, video encoder 20 may determine a first POC difference between a POC value for the current picture and a POC value for a first reference picture, to which a first motion vector ($MV_0$) refers, as a first temporal distance $TD_0$, and a second POC difference between the POC value for the current picture and a POC value for a second reference picture, to which a second motion vector ($MV_1$) refers, as a second temporal distance $TD_0$. $MV_0$ and $MV_1$ may include respective x- and y-components. For example, $MV_0$ may include $MV_{0x}$ and $MV_{0y}$ components, where $MV_{0x}$ describes a horizontal offset and $MV_{0y}$ describes a vertical offset relative to the position of the block in the current picture to determine a position at which to locate a reference block in the first reference picture. Similarly, $MV_1$ may include $MV_{1x}$ and $MV_{1y}$ components, where $MV_{1x}$ describes a horizontal offset and $MV_{1y}$ describes a vertical offset relative to the position of the block in the current picture to determine a position at which to locate a reference block in the second reference picture. Video encoder 20 may then use these values to execute either or both of formulas (6) and/or (7), or other similar formulas, to determine whether the motion vectors are at least almost in proportion to the temporal distances.

If the motion vectors are at least almost in proportion to the temporal distances ("YES" branch of 178), video encoder 20 may further determine whether the motion vectors are both non-zero (180). That is, video encoder 20 may determine whether at least one of the x-component or the y-component of each of the motion vectors has an absolute value greater than zero. Although the determination of whether the motion vectors are non-zero (step 180) is shown as a separate step from the determination of whether the motion vectors are at least almost in proportion to the temporal distances (step 178) in the example of FIG. 7, it should be understood that steps 178 and 180 may be performed as a single step, in other examples.

If the motion vectors are both non-zero ("YES" branch of 180), or if the motion vectors do not point in a common temporal direction ("NO" branch of 176), video encoder 20 may also determine whether the block is in a region of illumination change (182). If the block is not in a region of illumination change ("NO" branch of 182), video encoder 20 may proceed to predict the block using BIO (184), e.g., according to formulas (1)-(5) as discussed above. Alternatively, when predicting the block using BIO, video encoder 20 may modify gradient calculations according to the temporal distances $TD_0$ and/or $TD_1$. For example, video encoder 20 may calculate modified gradients $G_x'$ and $G_y'$ from the normally calculated gradients $G_x$ and $G_y$, such as by calculating $G_x'=G_x \cdot TD_0$ and $G_y'=G_y \cdot TD_1$. Video encoder 20 may then use $G_x'$ and $G_y'$ in place of $G_x$ and $G_y$ in formula (5).

On the other hand, in this example, if the motion vectors pointed in a common temporal direction but were not at least almost in proportion to the temporal distances ("NO" branch of 178), at least one of the motion vectors was zero-valued ("NO" branch of 180), or the block is in a region of illumination change ("YES" branch of 182), video encoder 20 may predict the block using standard bi-prediction, without using BIO (186). It should be understood that the determinations of whether the motion vectors point in a common temporal direction, whether the motion vectors are both non-zero, and whether the block is in a region of illumination change may be performed in any order, or in parallel, in various examples, such that the order of the determinations is not limited to the example shown in FIG. 7.

In any case, after predicting the block whether using BIO or not using BIO, video encoder 20 may proceed to entropy encode syntax elements for the block (188). In particular, video encoder 20 may determine pixel-by-pixel differences between the raw, original block and the predicted block to form a residual block. Video encoder 20 may then transform the residual block to a frequency domain to form transform coefficients, then quantize the transform coefficients. Video encoder 20 may then entropy encode the quantized transform coefficients. Video encoder 20 may further entropy encode other syntax elements, such as an indication that the block is predicted using bi-prediction, the motion vectors (e.g., using merge mode or advanced motion vector prediction (AMVP)), an illumination compensation flag (ic_flag) representing whether the block is in a region of illumination change, and the like.

In this manner, the method of FIG. 7 represents an example of a method of encoding video data including decoding a first reference picture and a second reference picture, the second reference picture being different than the first reference picture, wherein the first reference picture and the second reference picture are either both to be displayed before a current picture or both to be displayed after the current picture, determining a first motion vector ($MV_0$) from a current block of the current picture to a first reference block of the first reference picture, determining a second motion vector ($MV_1$) from the current block to a second reference block of the second reference picture, determining a first temporal distance ($TD_0$) from the current picture to the first reference picture, determining a second temporal distance ($TD_1$) from the current picture to the second reference picture, and encoding the current block according to bi-directional optical flow (BIO) using $MV_0$, $MV_1$, $TD_0$, and $TD_1$.

Figure 8:
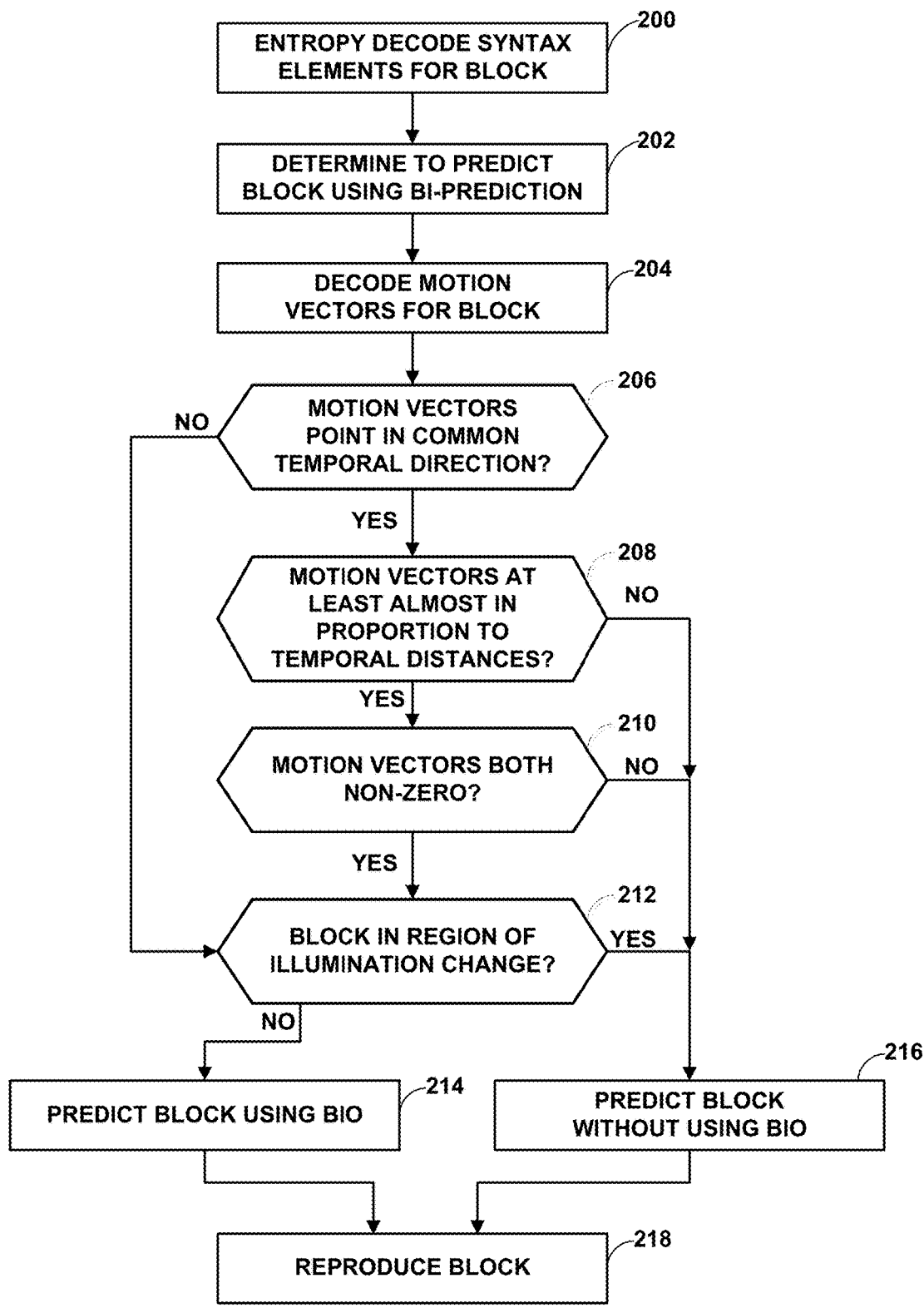
FIG. 8 is a flowchart illustrating an example method of decoding a block of video data in accordance with the techniques of this disclosure.

FIG. 8 is a flowchart illustrating an example method of decoding a block of video data in accordance with the techniques of this disclosure. The method of FIG. 8 is explained with respect to video decoder 30 of FIGS. 1 and 6. However, it should be understood that in other examples, other devices may be configured to perform the method of FIG. 8.

It is presumed that video decoder 30 initially decodes pictures for use as reference pictures for a current picture, where the reference pictures are stored in reference picture memory 82 (FIG. 6), although these steps are not illustrated in the example of FIG. 8. Video decoder 30 then entropy decodes syntax elements for a current block of the current picture (200). For example, video decoder 30 may entropy decode syntax elements indicating a prediction mode (e.g., intra- or inter-prediction mode), and corresponding syntax elements for the prediction mode such as, for inter-prediction, syntax elements related to merge mode or AMVP, as well as quantized residual coefficients to be used to reproduce a residual block for the current block.

In the example of FIG. 8, video decoder 30 determines to predict the current block using bi-prediction (202), e.g., based on the entropy decoded syntax elements for the current block. Accordingly, again using the entropy decoded syntax elements for the current block, video decoder 30 decodes motion vectors for the block (204). The motion vectors may refer to reference pictures stored in reference picture memory 82, which may both occur before the current picture in display order, both occur after the current picture in display order, or one may occur before the current picture in display order and the other may occur after the current picture in display order.

In this example, video decoder 30 determines whether the motion vectors for the block point in a common temporal direction (206). That is, video decoder 30 determines whether the motion vectors refer to reference pictures that both are to be displayed before or after the current picture, e.g., whether the reference pictures occur in the same reference picture list (such as list 0 or list 1).

If the two motion vectors point in a common temporal direction ("YES" branch of 206), video decoder 30 may further determine whether the motion vectors are at least almost in proportion to temporal distances between the current picture and the corresponding reference pictures (208). The temporal distances may correspond to differences between picture order count (POC) values for the current picture and the two reference pictures. "At least almost in proportion" generally refers to either being almost in proportion to the temporal distances, or in proportion to the temporal distances. Video decoder 30 may execute formulas (6) and/or (7) as discussed above to determine whether the motion vectors are at least almost in proportion to the temporal distances.

For example, video decoder 30 may determine a first POC difference between a POC value for the current picture and a POC value for a first reference picture, to which a first motion vector ($MV_0$) refers, as a first temporal distance $TD_0$, and a second POC difference between the POC value for the current picture and a POC value for a second reference picture, to which a second motion vector ($MV_1$) refers, as a second temporal distance $TD_0$. $MV_0$ and $MV_1$ may include respective x- and y-components. For example, $MV_0$ may include $MV_{0x}$ and $MV_{0y}$ components, where $MV_{0x}$ describes a horizontal offset and $MV_{0y}$ describes a vertical offset relative to the position of the block in the current picture to determine a position at which to locate a reference block in the first reference picture. Similarly, $MV_1$ may include $MV_{1x}$ and $MV_{1y}$ components, where $MV_{1x}$ describes a horizontal offset and $MV_{1y}$ describes a vertical offset relative to the position of the block in the current picture to determine a position at which to locate a reference block in the second reference picture. Video decoder 30 may then use these values to execute either or both of formulas (6) and/or (7), or other similar formulas, to determine whether the motion vectors are at least almost in proportion to the temporal distances.

Although not shown in the example of FIG. 8, as discussed above, calculating formulas (6) and/or (7) may involve the use of a threshold value Th. Video decoder 30 may store configuration data defining a value for Th. Additionally or alternatively, video decoder 30 may decode a value for a syntax element representative of Th. For example, video decoder 30 may receive this value as part of any or all of a video parameter set (VPS), a sequence parameter set (SPS), a picture parameter set (PPS), a slice header, and/or block-level syntax data.

If the motion vectors are at least almost in proportion to the temporal distances ("YES" branch of 208), video decoder 30 may further determine whether the motion vectors are both non-zero (210). That is, video decoder 30 may determine whether at least one of the x-component or the y-component of each of the motion vectors has an absolute value greater than zero. Although the determination of whether the motion vectors are non-zero (step 210) is shown as a separate step from the determination of whether the motion vectors are at least almost in proportion to the temporal distances (step 208) in the example of FIG. 8, it should be understood that steps 208 and 210 may be performed as a single step, in other examples.

If the motion vectors are both non-zero ("YES" branch of 210) or if the motion vectors do not point in a common temporal direction ("NO" branch of 206), video decoder 30 may also determine whether the block is in a region of illumination change (212). For example, video decoder 30 may determine a value for an illumination compensation flag (ic_flag) to determine whether the block is in a region of illumination change. In particular, in one example, if the value of the ic_flag is true, video decoder 30 determines that the block is in a region of illumination change. If the block is not in a region of illumination change ("NO" branch of 212), video decoder 30 may proceed to predict the block using BIO (214), e.g., according to formulas (1)-(5) as discussed above. Alternatively, when predicting the block using BIO, video decoder 30 may modify gradient calculations according to the temporal distances $TD_0$ and/or $TD_1$. For example, video decoder 30 may calculate modified gradients $G_x'$ and $G_y'$ from the normally calculated gradients $G_x$ and $G_y$, such as by calculating $G_x'=G_x \cdot TD_0$ and $G_y'=G_y \cdot TD_1$. Video decoder 30 may then use $G_x'$ and $G_y'$ in place of $G_x$ and $G_y$ in formula (5).

On the other hand, in this example, if the motion vectors pointed in a common temporal direction but were not at least almost in proportion to the temporal distances ("NO" branch of 208), at least one of the motion vectors was zero-valued ("NO" branch of 210), or the block is in a region of illumination change ("YES" branch of 212), video decoder 30 may predict the block using standard bi-prediction, without using BIO (216). It should be understood that the determinations of whether the motion vectors point in a common temporal direction, whether the motion vectors are both non-zero, and whether the block is in a region of illumination change may be performed in any order, or in parallel, in various examples, such that the order of the determinations is not limited to the example shown in FIG. 7.

In any case, after predicting the block whether using BIO or not using BIO, video decoder 30 may proceed to reproduce the block (218). In particular, video decoder 30 may inverse quantize the quantized transform coefficients to reproduce the transform coefficients. Video decoder 30 may then inverse transform the transform coefficients to reproduce a residual block for the current block. Then, video decoder 30 may combine the residual block with the predicted block (on a pixel by pixel basis) to reproduce the current block. This reproduced current block may also be referred to as a decoded block.

In this manner, the method of FIG. 8 represents an example of a method of decoding video data including decoding a first reference picture and a second reference picture, the second reference picture being different than the first reference picture, adding the first reference picture to a reference picture list for a current picture, wherein the first reference picture and the second reference picture are either both to be displayed before a current picture or both to be displayed after the current picture, determining a first motion vector ($MV_0$) from a current block of the current picture to a first reference block of the first reference picture, determining a second motion vector ($MV_1$) from the current block to a second reference block of the second reference picture, determining a first temporal distance ($TD_0$) from the current picture to the first reference picture, determining a second temporal distance ($TD_1$) from the current picture to the second reference picture, and decoding the current block according to bi-directional optical flow (BIO) using $MV_0$, $MV_1$, $TD_0$, and $TD_1$.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:

decoding a first reference picture and a second reference picture, the second reference picture being different than the first reference picture, wherein the first reference picture and the second reference picture are either both to be displayed before a current picture or both to be displayed after the current picture;

determining a first motion vector ($MV_0$) from a current block of the current picture to a first reference block of the first reference picture;

determining a second motion vector ($MV_1$) from the current block to a second reference block of the second reference picture;

determining a first temporal distance ($TD_0$) from the current picture to the first reference picture;

determining a second temporal distance ($TD_1$) from the current picture to the second reference picture; and decoding the current block according to bi-directional optical flow (BIO) using $MV_0$, $MV_1$, $TD_0$, and $TD_1$, wherein decoding the current block according to BIO comprises decoding the current block according to BIO when $MV_0$ and $MV_1$ are in proportion to $TD_0$ and $TD_1$, wherein $MV_0$ includes an x-component ($MV_{0x}$) and a y-component ($MV_{0y}$), wherein $MV_1$ includes an x-component ($MV_{1x}$) and a y-component ($MV_{1y}$), further comprising determining that $MV_0$ and $MV_1$ are in proportion to $TD_0$ and $TD_1$ when ($|MV_{0x}* TD_1 - MV_{1x}*TD_0|==0$ && $|MV_{0y}*TD_1 - MV_{1y}*TD_0|==0$).

2. The method of claim 1, further comprising decoding a second block according to BIO when $MV_0'$ and $MV_1'$ of the second block are almost in proportion to $TD_0'$ and $TD_1'$ of the second block, wherein $MV_0'$ includes an x-component ($MV_{0x}'$) and a y-component ($MV_{0y}'$), wherein $MV_1'$ includes an x-component ($MV_{1x}'$) and a y-component ($MV_{1y}'$), further comprising:

determining a threshold value (Th); and determining that $MV_0'$ and $MV_1'$ are almost in proportion to $TD_0'$ and $TD_1'$ when ($|MV_{0x}'*TD_1' - MV_{1x}'*TD_0'| <= Th$ && $|MV_{0y}'*TD_1' - MV_{1y}'*TD_0'| <= Th$).

3. The method of claim 2, wherein determining Th comprises retrieving configuration data defining Th.

4. The method of claim 2, wherein determining Th comprises decoding a syntax element defining Th.

5. The method of claim 4, wherein decoding the syntax element comprises decoding at least one of a sequence parameter set (SPS) including the syntax element, a picture parameter set (PPS) including the syntax element, a slice header including the syntax element, or block-level syntax including the syntax element.

6. The method of claim 1, wherein decoding the current block according to BIO comprises decoding the current block according to BIO only when $MV_0$ and $MV_1$ are non-zero.

7. The method of claim 1, wherein decoding the current block according to BIO comprises decoding the current block according to BIO only when an illumination compensation flag (ic_flag) of the current block of the current picture has a value indicating that the current block is not in a region of illumination change.

8. The method of claim 1, wherein decoding the current block according to BIO comprises decoding the current block according to the formula:

$$I_t = \frac{I_{t0} + I_{t1}}{2} + \frac{(G_{x0} \cdot V_{x0} \cdot TD_0 - G_{x1} \cdot V_{x1} \cdot TD_1) + (G_{y0} \cdot V_{y0} \cdot TD_0 - G_{y1} \cdot V_{y1} \cdot TD_1)}{2},$$

wherein $I_{t0}$ is a pixel on a motion trajectory of $MV_0$, $I_{t1}$ is a pixel on a motion trajectory of $MV_1$, $G_{x0}$ and $G_{y0}$ are gradients for the pixel on the motion trajectory of $MV_0$, $G_{x1}$ and $G_{y1}$ are gradients for the pixel on the motion trajectory of $MV1$, $V_{x0}$ and $V_{y0}$ define moving speeds for the pixel on the motion trajectory of $MV_0$, and $V_{x1}$ and $V_{y1}$ define moving speeds for the pixel on the motion trajectory of $MV_1$.

9. The method of claim 1, wherein decoding the current block according to BIO comprises decoding the current block based at least in part on a gradient with respect to the first reference picture ($G_x$), a gradient with respect to the second reference picture ($G_y$), $TD_0$, and $TD_1$.

10. The method of claim 9, wherein decoding the current block comprises decoding the current block using $G_x'$ and $G_y'$, wherein $G_x' = G_x \cdot TD_0$ and $G_y' = G_y \cdot TD_1$.

11. The method of claim 9, wherein decoding the current block comprises decoding the current block using $G_x'$ and $G_y'$, wherein $G_x'$ is calculated from $G_x$ and a factor related to $TD_0$, and $G_y'$ is calculated from $G_y$ and a factor related to $TD_1$.

12. The method of claim 1, further comprising:
adding the first reference picture to Reference Picture List 0 for the current picture; and
adding the second reference picture to Reference Picture List 0 for the current picture.

13. The method of claim 1, further comprising:
adding the first reference picture to Reference Picture List 1 for the current picture; and
adding the second reference picture to Reference Picture List 1 for the current picture.

14. The method of claim 1,
wherein determining $TD_0$ comprises calculating $TD_0$ as being equal to a first difference between a current picture order count (POC) value for the current picture and a first POC value for the first reference picture, and
wherein determining $TD_1$ comprises calculating $TD_1$ as being equal to a second difference between the current POC value for the current picture and a second POC value for the second reference picture.

15. A method of encoding video data, the method comprising:
decoding a first reference picture and a second reference picture, the second reference picture being different than the first reference picture, wherein the first reference picture and the second reference picture are either both to be displayed before a current picture or both to be displayed after the current picture;
determining a first motion vector ($MV_0$) from a current block of the current picture to a first reference block of the first reference picture;
determining a second motion vector ($MV_1$) from the current block to a second reference block of the second reference picture;
determining a first temporal distance ($TD_0$) from the current picture to the first reference picture;
determining a second temporal distance ($TD_1$) from the current picture to the second reference picture; and
encoding the current block according to bi-directional optical flow (BIO) using $MV_0$, $MV_1$, $TD_0$, and $TD_1$, wherein encoding the current block according to BIO comprises encoding the current block according to BIO when $MV_0$ and $MV_1$ are in proportion to $TD_0$ and $TD_1$, wherein $MV_0$ includes an x-component ($MV_{0x}$) and a y-component ($MV_{0y}$), wherein $MV_1$ includes an x-component ($MV_{1x}$) and a y-component ($MV_{1y}$), further comprising determining that $MV_0$ and $MV_1$ are in proportion to $TD_0$ and $TD_1$ when ($|MV_{0x}*TD_1 - MV_{1x}*TD_0| == 0$ && $|MV_{0y}*TD_1 - MV_{1y}*TD_0| == 0$).

16. The method of claim 15, further comprising encoding a second block according to BIO when $MV_0'$ and $MV_1'$ of the second block are almost in proportion to $TD_0'$ and $TD_1'$ of the second block, wherein $MV_0'$ includes an x-component ($MV_{0x}'$) and a y-component ($MV_{0y}'$), wherein $MV_1'$ includes an x-component ($MV_{1x}'$) and a y-component ($MV_{1y}'$), further comprising:
determining a threshold value (Th); and
determining that $MV_0'$ and $MV_1'$ are almost in proportion to $TD_0'$ and $TD_1'$ when ($|MV_{0x}'*TD_1' - MV_{1x}'*TD_0'| <= Th$ && $|MV_{0y}'*TD_1' - MV_{1y}'*TD_0'| <= Th$).

17. The method of claim 16, further comprising encoding a value for a syntax element defining Th.

18. The method of claim 17, wherein encoding the syntax element comprises encoding at least one of a sequence parameter set (SPS) including the syntax element, a picture parameter set (PPS) including the syntax element, a slice header including the syntax element, or block-level syntax including the syntax element.

19. The method of claim 15, wherein encoding the current block according to BIO comprises encoding the current block according to BIO only when $MV_0$ and $MV_1$ are non-zero.

20. The method of claim 15, wherein encoding the current block according to BIO comprises encoding the current block according to BIO only when the current block is not in a region of illumination change.

21. The method of claim 15, wherein encoding the current block according to BIO comprises encoding the current block according to the formula:

$$I_t = \frac{I_{t0} + I_{t1}}{2} + \frac{(G_{x0} \cdot V_{x0} \cdot TD_0 - G_{x1} \cdot V_{x1} \cdot TD_1) + (G_{y0} \cdot V_{y0} \cdot TD_0 - G_{y1} \cdot V_{y1} \cdot TD_1)}{2},$$

wherein $I_{t0}$ is a pixel on a motion trajectory of $MV_0$, $I_{t1}$ is a pixel on a motion trajectory of $MV_1$, $G_{x0}$ and $G_{y0}$ are gradients for the pixel on the motion trajectory of $MV_0$, $G_{x1}$ and $G_{y1}$ are gradients for the pixel on the motion trajectory of $MV_1$, $V_{x0}$ and $V_{y0}$ define moving speeds for the pixel on the motion trajectory of $MV_0$, and $V_{x1}$ and $V_{y1}$ define moving speeds for the pixel on the motion trajectory of $MV_1$.

22. The method of claim 15, wherein encoding the current block according to BIO comprises encoding the current block based at least in part on a gradient with respect to the first reference picture ($G_x$), a gradient with respect to the second reference picture ($G_y$), $TD_0$, and $TD_1$.

23. The method of claim 22, wherein encoding the current block comprises encoding the current block using $G_x'$ and $G_y'$, wherein $G_x'=G_x \cdot TD_0$ and $G_y'=G_y \cdot TD_1$.

24. The method of claim 22, wherein encoding the current block comprises encoding the current block using $G_x'$ and $G_y'$, wherein $G_x'$ is calculated from $G_x$ and a factor related to $TD_0$, and $G_y'$ is calculated from $G_y$ and a factor related to $TD_1$.

25. A device for decoding video data, the device comprising:
a memory configured to store video data; and
one or more processors configured to:
decode a first reference picture and a second reference picture of the video data, the second reference picture being different than the first reference picture, wherein the first reference picture and the second reference picture are either both to be displayed before a current picture or both to be displayed after the current picture;
determine a first motion vector ($MV_0$) from a current block of the current picture to a first reference block of the first reference picture;
determine a second motion vector ($MV_1$) from the current block to a second reference block of the second reference picture;
determine a first temporal distance ($TD_0$) from the current picture to the first reference picture;
determine a second temporal distance ($TD_1$) from the current picture to the second reference picture; and
decode the current block according to bi-directional optical flow (BIO) using $MV_0$, $MV_1$, $TD_0$, and $TD_1$, wherein to decode the current block according to BIO, the one or more processors are configured to decode the current block according to BIO when $MV_0$ and $MV_1$ are in proportion to $TD_0$ and $TD_1$, wherein $MV_0$ includes an x-component ($MV_{0x}$) and a y-component ($MV_{0y}$), wherein $MV_1$ includes an x-component ($MV_{1x}$) and a y-component ($MV_{1y}$), and wherein the one or more processors are configured to determine that $MV_0$ and $MV_1$ are in proportion to $TD_0$ and $TD_1$ when ($|MV_{0x}*TD_1 - MV_{1x}*TD_0|==0 \&\& |MV_{0y}*TD_1 - MV_{1y}*TD_0|==0$).

26. The device of claim 25, wherein the processors are configured to decode a second block according to BIO when $MV_0'$ and $MV_1'$ of the second block are almost in proportion to $TD_0'$ and $TD_1'$ of the second block, wherein $MV_0'$ includes an x-component ($MV_{0x}'$) and a y-component ($MV_{0y}'$), wherein $MV_1'$ includes an x-component ($MV_{1x}'$) and a y-component ($MV_{1y}'$), and wherein the processors are further configured to:
determine a threshold value (Th); and
determine that $MV_0'$ and $MV_1'$ are almost in proportion to $TD_0'$ and $TD_1'$ when ($|MV_{0x}'*TD_1' - MV_{1x}'*TD_0'|<=Th \&\& |MV_{0y}'*TD_1' - MV_{1y}'*TD_0'|<=Th$).

27. The device of claim 25, wherein the processors are configured to decode the current block according to BIO only when $MV_0$ and $MV_1$ are non-zero.

28. The device of claim 25, wherein the processors are configured to decode the current block according to BIO only when an illumination compensation flag (ic_flag) of the current block of the current picture has a value indicating that the current block is not in a region of illumination change.

29. The device of claim 25, wherein the processors are configured to decode the current block according to BIO using the formula:

$$I_t = \frac{I_{t0} + I_{t1}}{2} + \frac{(G_{x0} \cdot V_{x0} \cdot TD_0 - G_{x1} \cdot V_{x1} \cdot TD_1) + (G_{y0} \cdot V_{y0} \cdot TD_0 - G_{y1} \cdot V_{y1} \cdot TD_1)}{2},$$

wherein $I_{t0}$ is a pixel on a motion trajectory of $MV_0$, $I_{t1}$ is a pixel on a motion trajectory of $MV_1$, $G_{x0}$ and $G_{y0}$ are gradients for the pixel on the motion trajectory of $MV_0$, $G_{x1}$ and $G_{y1}$ are gradients for the pixel on the motion trajectory of $MV1$, $V_{x0}$ and $V_{y0}$ define moving speeds for the pixel on the motion trajectory of $MV_0$, and $V_{x1}$ and $V_{y1}$ define moving speeds for the pixel on the motion trajectory of $MV_1$.

30. The device of claim 25, wherein the processors are configured to decode the current block based at least in part on a gradient with respect to the first reference picture ($G_x$), a gradient with respect to the second reference picture ($G_y$), $TD_0$, and $TD_1$.

31. The device of claim 25, wherein the device comprises a display configured to display a picture including the decoded current block.

32. The device of claim 25, wherein the device comprises one or more of a camera, a computer, a mobile device, a broadcast receiver device, or a set-top box.

33. A device for decoding a picture of video data, the device comprising:
means for decoding a first reference picture and a second reference picture, the second reference picture being different than the first reference picture, wherein the first reference picture and the second reference picture are either both to be displayed before a current picture or both to be displayed after the current picture;
means for determining a first motion vector ($MV_0$) from a current block of the current picture to a first reference block of the first reference picture;
means for determining a second motion vector ($MV_1$) from the current block to a second reference block of the second reference picture;
means for determining a first temporal distance ($TD_0$) from the current picture to the first reference picture;
means for determining a second temporal distance ($TD_1$) from the current picture to the second reference picture; and
means for decoding the current block according to bi-directional optical flow (BIO) using $MV_0$, $MV_1$, $TD_0$, and $TD_1$, wherein the means for decoding the current block according to BIO comprises means for decoding the current block according to BIO when $MV_0$ and $MV_1$ are in proportion to $TD_0$ and $TD_1$, wherein $MV_0$ includes an x-component ($MV_{0x}$) and a y-component ($MV_{0y}$), wherein $MV_1$ includes an x-component ($MV_{1x}$) and a y-component ($MV_{1y}$), further comprising means for determining that $MV_0$ and $MV_1$ are in proportion to $TD_0$ and $TD_1$ when ($|MV_{0x}*TD_1 - MV_{1x}*TD_0|==0 \&\& |MV_{0y}*TD_1 - MV_{1y}*TD_0|==0$).

34. The device of claim 33, further comprising means for decoding a second block according to BIO according to BIO when $MV_0'$ and $MV_1'$ of the second block are almost in proportion to $TD_0'$ and $TD_1'$ of the second block, wherein $MV_0'$ includes an x-component ($MV_{0x}'$) and a y-component ($MV_{0y}'$), wherein $MV_1'$ includes an x-component ($MV_{1x}'$) and a y-component ($MV_{1y}'$), further comprising:
 means for determining a threshold value (Th); and
 means for determining that $MV_0'$ and $MV_1'$ are almost in proportion to $TD_0'$ and $TD_1'$ when ($|MV_{0x}'*TD_1'-MV_{1x}'*TD_0'|<=Th$ &&$|MV_{0y}'*TD_1'-MV_{1y}'*TD_0'|<=Th$).

35. The device of claim 33, wherein the means for decoding the current block according to BIO comprises means for decoding the current block according to BIO only when $MV_0$ and $MV_1$ are non-zero.

36. The device of claim 33, wherein the means for decoding the current block according to BIO comprises means for decoding the current block according to BIO only when an illumination compensation flag (ic_flag) of the current block of the current picture has a value indicating that the current block is not in a region of illumination change.

37. The device of claim 33, wherein the means for decoding the current block according to BIO comprises means for decoding the current block according to the formula:

$$I_t = \frac{I_{t0}+I_{t1}}{2} + \frac{(G_{x0} \cdot V_{x0} \cdot TD_0 - G_{x1} \cdot V_{x1} \cdot TD_1) + (G_{y0} \cdot V_{y0} \cdot TD_0 - G_{y1} \cdot V_{y1} \cdot TD_1)}{2},$$

wherein $I_{t0}$ is a pixel on a motion trajectory of $MV_0$, $I_{t1}$ is a pixel on a motion trajectory of $MV_1$, $G_{x0}$ and $G_{y0}$ are gradients for the pixel on the motion trajectory of $MV_0$, $G_{x1}$ and $G_{y1}$ are gradients for the pixel on the motion trajectory of $MV1$, $V_{x0}$ and $V_{y0}$ define moving speeds for the pixel on the motion trajectory of $MV_0$, and $V_{x1}$ and $V_{y1}$ define moving speeds for the pixel on the motion trajectory of $MV_1$.

38. The device of claim 33, wherein the means for decoding the current block according to BIO comprises means for decoding the current block based at least in part on a gradient with respect to the first reference picture ($G_x$), a gradient with respect to the second reference picture ($G_y$), $TD_0$, and $TD_1$.

39. A non-transitory computer-readable storage medium having stored thereon instructions that, when executed, cause a processor of a device for decoding video data to:
 decode a first reference picture and a second reference picture, the second reference picture being different than the first reference picture, wherein the first reference picture and the second reference picture are either both to be displayed before a current picture or both to be displayed after the current picture;
 determine a first motion vector ($MV_0$) from a current block of the current picture to a first reference block of the first reference picture;
 determine a second motion vector ($MV_1$) from the current block to a second reference block of the second reference picture;
 determine a first temporal distance ($TD_0$) from the current picture to the first reference picture;
 determine a second temporal distance ($TD_1$) from the current picture to the second reference picture; and
 decode the current block according to bi-directional optical flow (BIO) using $MV_0$, $MV_1$, $TD_0$, and $TD_1$, wherein the instructions that cause the processor to decode the current block according to BIO comprise instructions that cause the processor to decode the current block according to BIO when $MV_0$ and $MV_1$ are in proportion to $TD_0$ and $TD_1$, wherein $MV_0$ includes an x-component ($MV_{0x}$) and a y-component ($MV_{0y}$), wherein $MV_1$ includes an x-component ($MV_{1x}$) and a y-component ($MV_{1y}$), further comprising instructions that cause the processor to determine that $MV_0$ and $MV_1$ are in proportion to $TD_0$ and $TD_1$ when ($|MV_{0x}*TD_1 MV_{1x}* TD_0|==0$&&$|MV_{0y}*TD_1-MV_{1y}*TD_0|==0$).

40. The non-transitory computer-readable storage medium of claim 39, further comprising instructions that cause the processor to decode a second block according to BIO when $MV_0'$ and $MV_1'$ of the second block are almost in proportion to $TD_0'$ and $TD_1'$ of the second block, wherein $MV_0'$ includes an x-component ($MV_{0x}'$) and a y-component ($MV_{0y}'$), wherein $MV_1'$ includes an x-component ($MV_{1x}'$) and a y-component ($MV_{1y}'$), further comprising instructions that cause the processor to:
 determine a threshold value (Th); and
 determine that $MV_0'$ and $MV_1'$ are almost in proportion to $TD_0'$ and $TD_1'$ when ($|MV_{0x}'*TD_1-MV_{1x}'*TD_0'|<=Th$ &&$|MV_{0y}'*TD_1'-MV_{1y}'*TD_0'|<=Th$).

41. The non-transitory computer-readable storage medium of claim 39, wherein the instructions that cause the processor to decode the current block according to BIO comprise instructions that cause the processor to decode the current block according to BIO only when $MV_0$ and $MV_1$ are non-zero.

42. The non-transitory computer-readable storage medium of claim 39, wherein the instructions that cause the processor to decode the current block according to BIO comprise instructions that cause the processor to decode the current block according to BIO only when an illumination compensation flag (ic_flag) of the current block of the current picture has a value indicating that the current block is not in a region of illumination change.

43. The non-transitory computer-readable storage medium of claim 39, wherein the instructions that cause the processor to decode the current block according to BIO comprise instructions that cause the processor to decode the current block according to the formula:

$$I_t = \frac{I_{t0}+I_{t1}}{2} + \frac{(G_{x0} \cdot V_{x0} \cdot TD_0 - G_{x1} \cdot V_{x1} \cdot TD_1) + (G_{y0} \cdot V_{y0} \cdot TD_0 - G_{y1} \cdot V_{y1} \cdot TD_1)}{2},$$

wherein $I_{t0}$ is a pixel on a motion trajectory of $MV_0$, $I_{t1}$ is a pixel on a motion trajectory of $MV_1$, $G_{x0}$ and $G_{y0}$ are gradients for the pixel on the motion trajectory of $MV_0$, $G_{x1}$ and $G_{y1}$ are gradients for the pixel on the motion trajectory of $MV1$, $V_{x0}$ and $V_{y0}$ define moving speeds for the pixel on the motion trajectory of $MV_0$, and $V_{x1}$ and $V_{y1}$ define moving speeds for the pixel on the motion trajectory of $MV_1$.

44. The non-transitory computer-readable storage medium of claim 39, wherein the instructions that cause the processor to decode the current block according to BIO comprise instructions that cause the processor to decode the current block based at least in part on a gradient with respect to the first reference picture ($G_x$), a gradient with respect to the second reference picture ($G_y$), $TD_0$, and $TD_1$.

\* \* \* \* \*